United States Patent
Uchiyama

(10) Patent No.: US 10,433,153 B2
(45) Date of Patent: Oct. 1, 2019

(54) SYSTEM, METHOD, AND TERMINAL DEVICE

(71) Applicant: SONY CORPORATION, Tokyo (JP)

(72) Inventor: Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 16 days.

(21) Appl. No.: 15/570,406

(22) PCT Filed: May 10, 2016

(86) PCT No.: PCT/JP2016/063930
§ 371 (c)(1),
(2) Date: Oct. 30, 2017

(87) PCT Pub. No.: WO2016/203874
PCT Pub. Date: Dec. 22, 2016

(65) Prior Publication Data
US 2018/0146360 A1   May 24, 2018

(30) Foreign Application Priority Data

Jun. 18, 2015 (JP) ................................ 2015-123252

(51) Int. Cl.
| | |
|---|---|
| *H04W 72/00* | (2009.01) |
| *H04W 8/02* | (2009.01) |
| *H04W 28/08* | (2009.01) |
| *H04W 68/00* | (2009.01) |
| *H04W 4/029* | (2018.01) |

(52) U.S. Cl.
CPC ............. *H04W 8/02* (2013.01); *H04W 4/029* (2018.02); *H04W 28/08* (2013.01); *H04W 68/00* (2013.01); *H04W 68/005* (2013.01)

(58) Field of Classification Search
CPC ....... H04W 8/082; H04W 8/26; H04W 8/085; H04W 8/04
See application file for complete search history.

(56) References Cited

U.S. PATENT DOCUMENTS

| | | | |
|---|---|---|---|
| 8,170,566 B2* | 5/2012 | Pudney | ................. H04W 40/34 455/445 |
| 2005/0153694 A1 | 7/2005 | Chung | |

(Continued)

FOREIGN PATENT DOCUMENTS

| | | |
|---|---|---|
| EP | 1 289 223 A2 | 3/2003 |
| EP | 1 942 610 A1 | 7/2008 |

(Continued)

OTHER PUBLICATIONS

International Search Report dated Jul. 12, 2016, in PCT/JP2016/063930, filed May 10, 2016.

(Continued)

*Primary Examiner* — Khalid W Shaheed
(74) *Attorney, Agent, or Firm* — Xsensus, LLP

(57) ABSTRACT

[Object] To provide a system, a method, and a terminal device capable of performing mobility management of a terminal in a distributed manner.
[Solution] A system including a plurality of management devices configured to manage information of one or more terminal devices positioned in management areas. The plurality of management devices have a layered structure in which the management area of the management device in an upper layer includes the management area of the management device in a lower layer.

18 Claims, 17 Drawing Sheets

(56) References Cited

U.S. PATENT DOCUMENTS

| | | | | |
|---|---|---|---|---|
| 2009/0232019 A1* | 9/2009 | Gupta | .................... | H04L 12/287 370/252 |
| 2012/0289230 A1 | 11/2012 | Uno et al. | | |
| 2013/0122911 A1* | 5/2013 | Zdarsky | ................ | H04W 8/082 455/438 |
| 2014/0128110 A1* | 5/2014 | Wang | .................... | H04W 64/00 455/458 |
| 2016/0337271 A1* | 11/2016 | McCann | ................. | H04L 49/70 |
| 2017/0013495 A1* | 1/2017 | Chae | ..................... | H04W 76/14 |
| 2017/0048710 A1* | 2/2017 | Agarwal | ................. | H04W 8/04 |

FOREIGN PATENT DOCUMENTS

| | | |
|---|---|---|
| JP | 2005-176387 A | 6/2005 |
| JP | 2009-38590 A | 2/2009 |
| JP | 2011-142545 A | 7/2011 |
| JP | 2011-254394 A | 12/2011 |
| JP | 2013-533711 A | 8/2013 |
| WO | 2007/001948 A2 | 1/2007 |
| WO | 2008/088271 A1 | 7/2008 |
| WO | 2013/167031 A2 | 11/2013 |

OTHER PUBLICATIONS

ETSI, "Mobile-Edge Computing," Mobile-Edge Computing—Introductory Technical White Paper, Issue 1, https://portal.etsi.org/Portal/0/TBpages/MEC/Docs/Mobile-edge_Computing_-_Introductory_Technical_White_Paper_V1%2018-09-14.pdf, May 28, 2015, pp. 1-36.

Extended European Search Report dated Dec. 18, 2019 in European Application No. 16811349.6-1217.

* cited by examiner

SYSTEM, METHOD, AND TERMINAL DEVICE

TECHNICAL FIELD

The present disclosure relates to a system, a method, and a terminal device.

BACKGROUND ART

In recent years, there has attracted attention a mobile-edge computing (MEC) technology of performing data processing in a server (hereinafter, also referred to as an edge server) provided at a position physically close to a terminal device such as a smartphone. For example, a standard of a technology regarding MEC is studied in Non-Patent Literature 1 cited below.

In MEC, an edge server is disposed at a position physically close to a terminal device, and therefore a communication delay is reduced, as compared to a general cloud server that is concentratedly disposed, and it is possible to use an application required to have high real-time performance. Further, in MEC, the edge server close to the terminal device is caused to perform distributed processing of a function that has been processed on the terminal device side so far, and therefore it is possible to realize high-speed network/application processing, regardless of performance of the terminal device. The edge server may have various functions such as a function serving as an application server and a function serving as a content server and can provide various services to the terminal device.

CITATION LIST

Non-Patent Literature

Non-Patent Literature 1: ETSI, "Mobile-Edge Computing-Introductory Technical White Paper", September, 2014, [searched on May 28, 2015], the Internet <https://portal.etsi.org/Portals/0/TBpages/MEC/Docs/Mobile-edge_Computing_-_Introductory_Technical_White_Paper_V1%2018-09-14.pdf>

DISCLOSURE OF INVENTION

Technical Problem

Content studied in Non-Patent Literature 1 cited above or the like has not been studied long, and it cannot be said that the technology regarding MEC has been satisfactorily proposed. For example, a technology regarding mobility management of a terminal is one of technologies that have not been satisfactorily proposed.

In view of this, the present disclosure proposes a system, a method, and a terminal device, each of which is new, is improved, and is capable of performing mobility management of a terminal in a distributed manner.

Solution to Problem

According to the present disclosure, there is provided a system including a plurality of management devices configured to manage information of one or more terminal devices positioned in management areas. The plurality of management devices have a layered structure in which the management area of the management device in an upper layer includes the management area of the management device in a lower layer.

Further, according to the present disclosure, there is provided a method including in a case where a management device included in a system including a plurality of management devices configured to manage information of one or more terminal devices positioned in management areas and having a layered structure in which the management area of the management device in an upper layer includes the management area of the management device in a lower layer recognizes a possibility of movement of the terminal device serving as a management target to outside of the management area, notifying another one of the management devices in a same layer or an upper layer of information indicating the possibility of the movement of the terminal device.

Further, according to the present disclosure, there is provided a terminal device managed by a system including a plurality of management devices configured to manage information of one or more terminal devices positioned in management areas and having a layered structure in which the management area of the management device in an upper layer includes the management area of the management device in a lower layer.

Advantageous Effects of Invention

As described above, according to the present disclosure, it is possible to perform mobility management of a terminal in a distributed manner. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
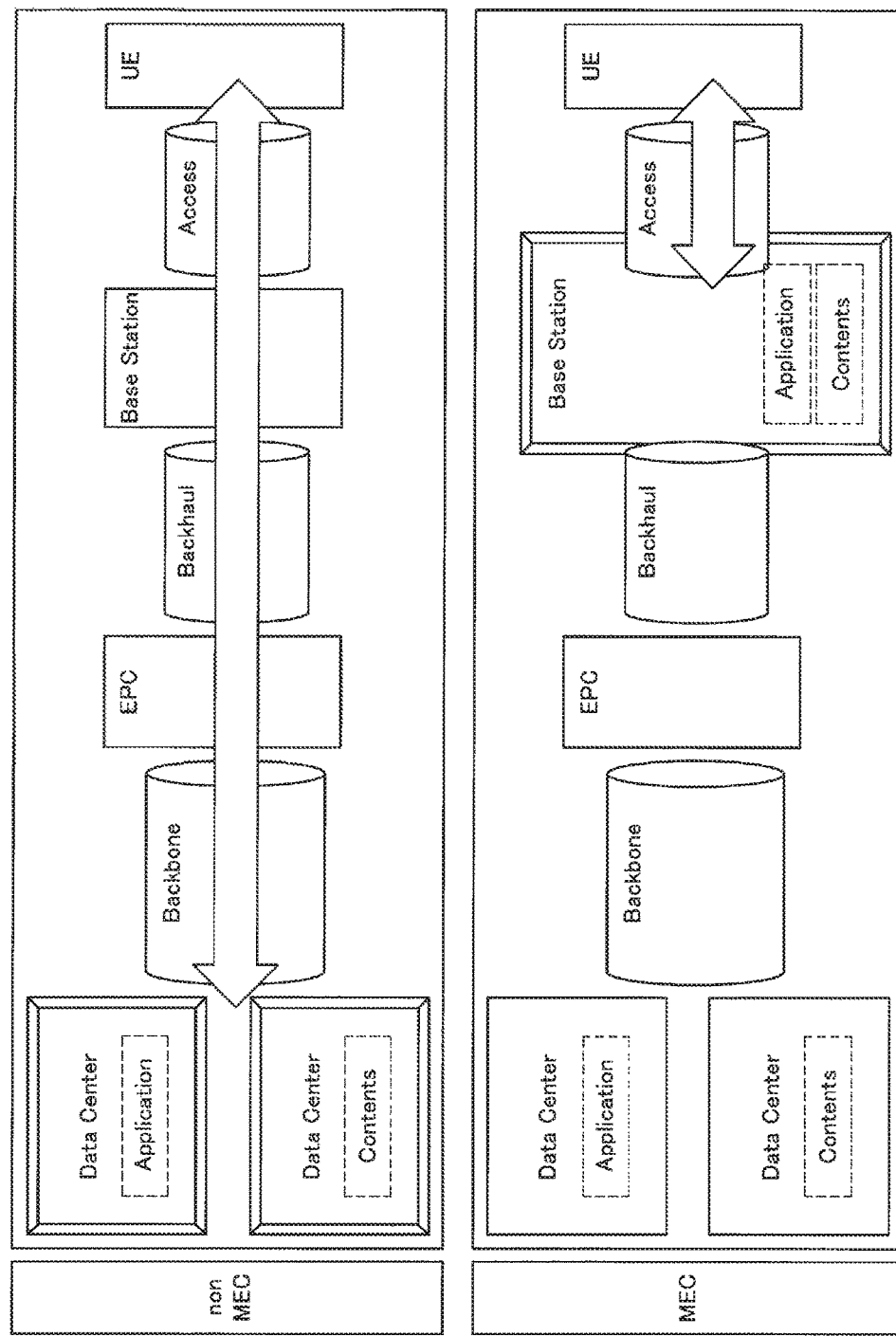
FIG. 1 is an explanatory view for describing an outline of MEC.

Hereinafter, (a) preferred embodiment(s) of the present disclosure will be described in detail with reference to the appended drawings. In this specification and the appended drawings, constituent elements that have substantially the same function and structure are denoted with the same reference numerals, and repeated explanation of these constituent elements is omitted.

Further, in this specification and the drawings, there are cases in which elements having substantially the same function are distinguished by adding different alphabets to the end of the same reference numeral. For example, a plurality of elements having substantially the same functional configuration are distinguished as necessary like terminal devices 200A, 200B, and 200C. However, in a case where it is unnecessary to distinguish each of the plurality of elements having substantially the same functional configuration, only the same reference numeral is added. For example, in a case where it is unnecessary to particularly distinguish terminal devices 200A, 200B, and 200C, they are referred to as simply as a "terminal device 200."

Note that description will be provided in the following order.
1. Introduction
   1.1. MEC
   1.2. Paging
   1.3. Technical problem
2. Configuration of system
   2.1. Schematic configuration
   2.2. Detailed configuration
3. Configuration of each device
   3.1. Configuration of terminal device
   3.2. Configuration of management device
   3.3. Configuration of coordinator
4. Technical features
5. Processing flows
   5.1. Basic processing flow
   5.2. Detailed processing flows
6. Application example
7. Conclusion

1. INTRODUCTION

1.1. MEC (1) Outline

First, an outline of MEC will be described with reference to FIG. 1.

FIG. 1 is an explanatory view for describing an outline of MEC. An upper part of FIG. 1 illustrates a communication path for allowing user equipment (UE) to access an application and contents in current (MEC is not introduced) mobile communication represented by long term evolution (LTE). Further, a lower part thereof illustrates a communication path for allowing the UE to access an application and contents in a case where MEC is introduced.

As illustrated in the upper part of FIG. 1, in the current mobile communication, an application and contents are disposed in IP networks existing on the outside of an evolved packet core (EPC) (a side far from the UE). Thus, in order to execute an application or acquire contents, the UE performs communication via all a relay network (for example, Backbone network), the EPC, a backhaul link, a base station, and an access link which exist on a path to a data center. Therefore, enormous network costs and delay occur.

Meanwhile, as illustrated in the lower part of FIG. 1, in MEC, an application and contents are held on the inside of the EPC (a side close to the UE). For example, in the example illustrated in FIG. 1, a MEC server (i.e., edge server) integrally provided with a base station functions as an application server and a content server. Thus, the UE only needs to perform communication on the inside of the EPC in order to execute an application or acquire contents. Therefore, by introducing MEC, it is possible to not only perform communication with extremely-short delay but also reduce traffic other than the access link (for example, the backhaul link, the EPC, and the relay network). Furthermore, reduction in delay of communication and reduction in traffic other than the access link may also contribute to improvement in throughput and reduction in power consumption on the UE and the network side. As described above, introduction of MEC may have various merits for a user, a network provider, and a service provider. In MEC, data is subjected to distributed processing on a side closer to a local side (i.e., a side close to the UE), and therefore MEC is particularly expected to be applied to an application rooted in an area.

Note that FIG. 1 illustrates an example in which the MEC server is integrally provided with the base station. However, the present technology is not limited to such an example. The MEC server may be provided as a device different from the base station or may be physically separated from the base station. In the present embodiment, description will be provided by assuming that the MEC server is integrally provided with the base station as an example. Hereinafter, a MEC server integrally provided with a base station will also be referred to as a MEC server corresponding to a base station, and, similarly, a base station integrally provided with a MEC server will also be referred to as a base station corresponding to a MEC server.

(2) Platform

Next, a platform of a MEC server will be described with reference to FIG. 2.

Figure 2:
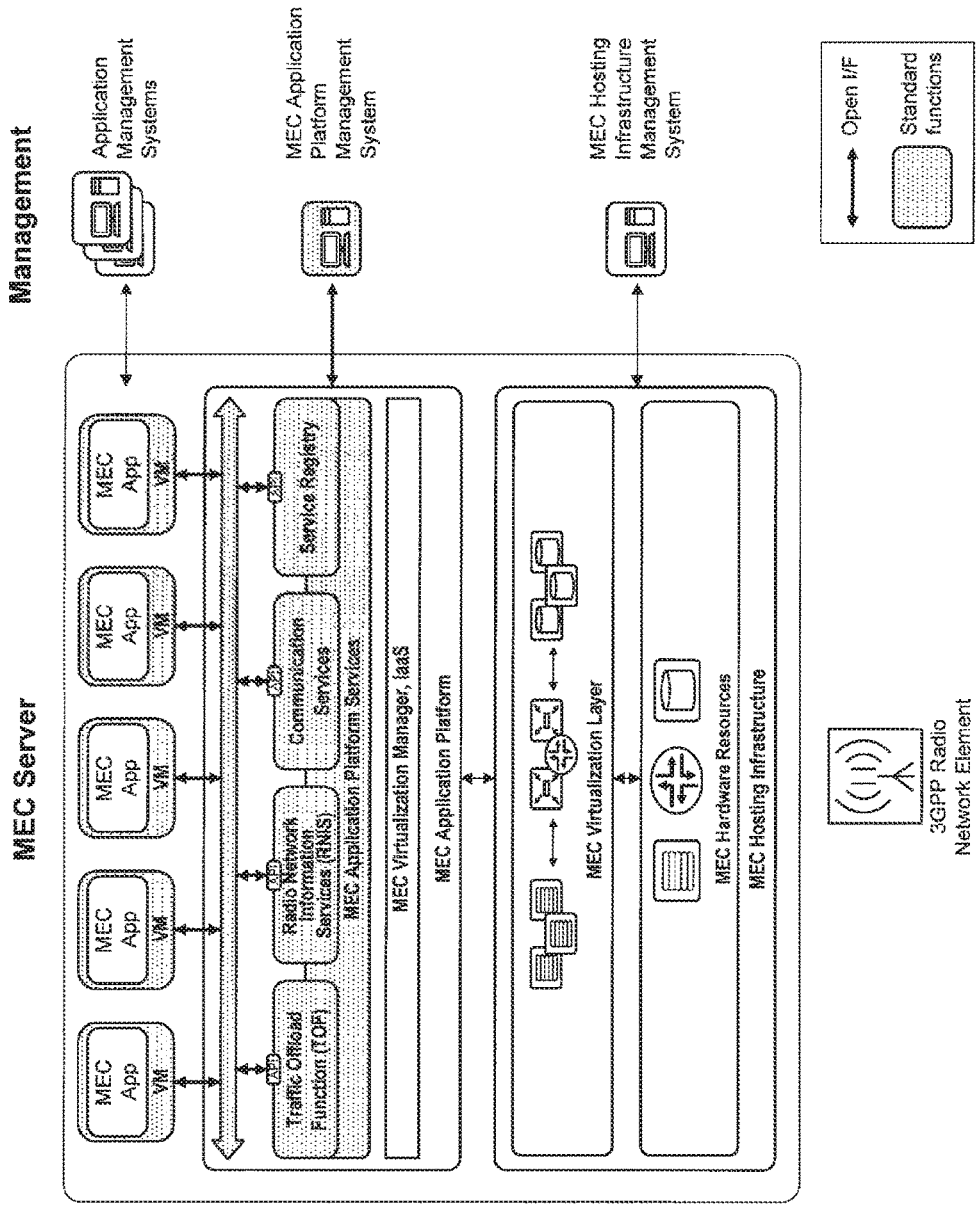
FIG. 2 is an explanatory view for describing a platform of a MEC server.

FIG. 2 is an explanatory view for describing the platform of the MEC server. A 3GPP radio network element that is the lowest constituent element is base station equipment such as an antenna and an amplifier. A hosting infrastructure thereon is made up of hardware resources, such as server equipment and a virtualization layer formed by software that virtualizes those hardware resources, and can provide a general virtual server technology. An application platform operates on this virtual server.

A virtualization manager performs management such as generation and deletion of a virtual machine (VM) serving as an environment in which each highest application (MEC App) operates. Each application may be executed by different companies, and therefore the virtualization manager is required to consider security, division of a resource to be assigned, and the like, but it is possible to apply a general cloud infrastructure technology.

An application platform service is an aggregate of common services that are characteristic of MEC. A traffic offload function performs switching control such as routing between a case where a request from the UE is processed by an application on the MEC server and a case where the request is processed by an application on the Internet (master application on a data server). In a case where each application on the MEC server needs wireless status information such as intensity of a radio wave between a base station corresponding to the MEC server and the UE, radio network information services acquire information from a lower wireless network and provide the information to the application. Communication services provide a path for allowing each application on the MEC server to communicate with the UE or an application on the Internet. In a case where a request for generation or operation of each application on the MEC server is received, a service registry authenticates whether or not the application is legitimate, registers the application, and responds to an inquiry from other entities.

Each application in each VM operates on the application platform described above and provides various kinds of services to the UE, instead of the application on the Internet or in corporation with the application.

MEC servers are expected to be installed in a large number of base stations, and therefore study of a structure for managing and linking a large number of MEC servers is also required. A hosting infrastructure management system, an application platform management system, and an application management system manage corresponding entities on the MEC server and link the entities.

(3) Tendency of Standardization

In Europe, industry specification groups (ISG) were established in the ETSI and standardization work of MEC was started in October, 2014. The standardization work is currently worked with a view to preparing a first specification by the end of 2016. More specifically, standardization of API to realize MEC has been mainly worked under cooperation of ETSI ISG network function virtualization (NFV) and the 3GPP.

1.2. Paging (1) System Configuration of LTE

First, a configuration of a core network of LTE will be described with reference to FIG. 3.

Figure 3:
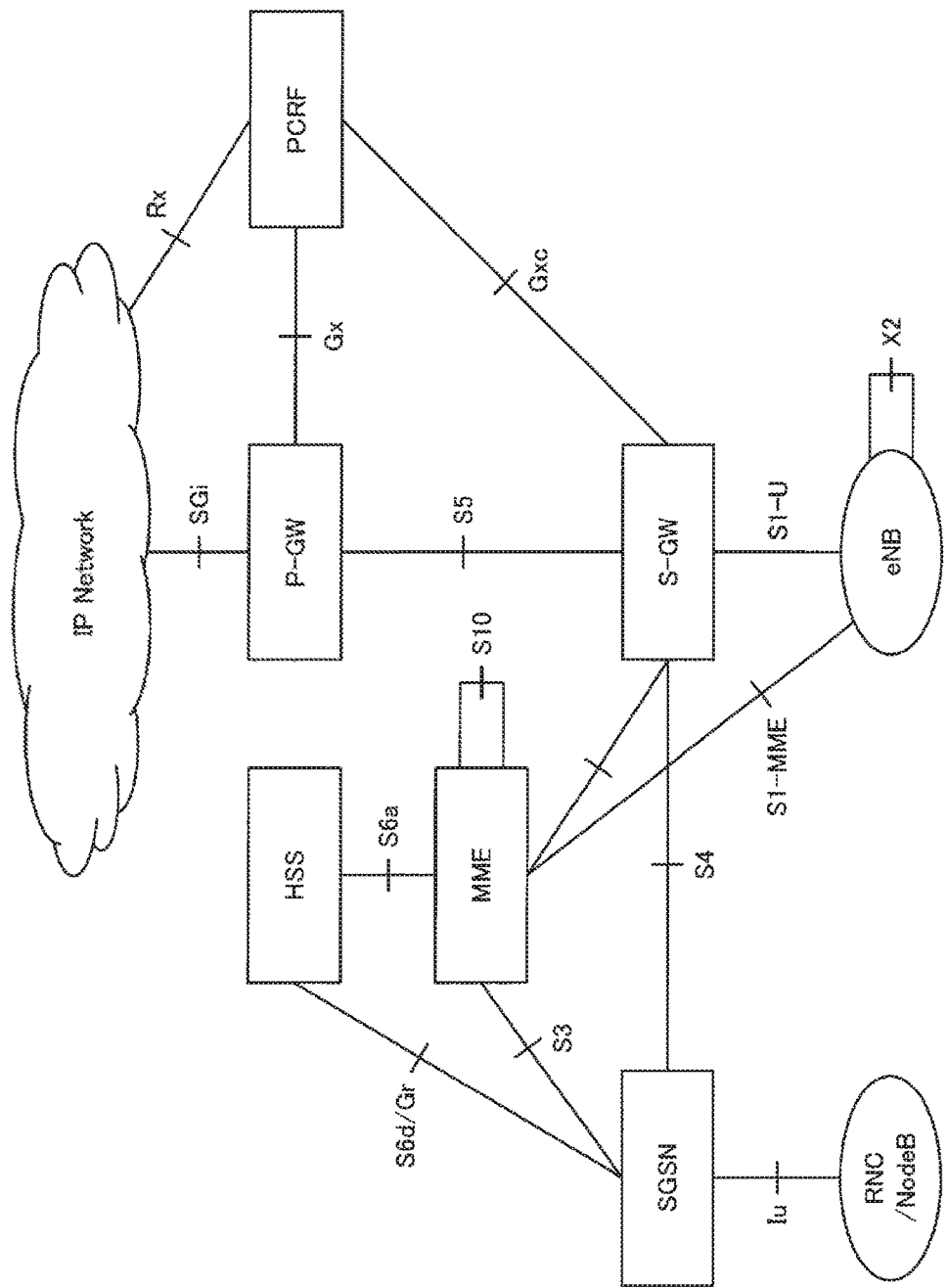
FIG. 3 is an explanatory view for describing an example of a configuration of a core network of LTE.

FIG. 3 is an explanatory view for describing an example of the configuration of the core network of LTE. FIG. 3 illustrates a configuration of a part from an IP network to a base station.

A mobility management entity (MME) houses a base station (typically, eNodeB) via an S1-MME interface and performs mobility management of a terminal, authentication (including security control), and setting processing of a transfer path of user data. The MME performs the mobility management of the terminal and the authentication processing in cooperation with a home subscriber server (HSS) via an S6a interface. Regarding the mobility management, in order to improve efficiency of position management registration processing caused by movement between wireless areas of LTE and 3G, the MME can perform position registration control in cooperation with a serving GPRS support node (SGSN) serving as a logical node of a 3G core network via an S3 interface. Further, the MME transmits/receives a control signal to/from the eNodeB and a serving gateway (S-GW) via the S1-MME and an S11 interface and sets and opens a transfer path of user data via an S1-U interface serving as a section between the S-GW and the eNodeB.

A PCRF determines policies of QoS for performing communication quality control in a P-GW, the S-GW, and a Trusted Non-3GPP IP Access, a charging method thereof, and the like, and distributes policy information via Gx, Gxc, and Gxa interfaces, respectively.

The HSS is a member information database regarding a contractor/user (for example, UE) who has a contract with an operator. The HSS manages, for example, authentication information and information indicating where the UE currently exists. Further, the HSS performs control of a service to be provided to the UE. In a case where the UE is roaming, existence of the UE in a roaming destination is also managed by the HSS.

The S-GW mainly deals with data (IP data) of a user plane. The S-GW is an entity that connects a radio access network (RAN) and a core network and performs routing of data while coping with mobility of each UE.

The packet data network gateway (P-GW) mainly deals with data (IP data) of a user plane. The P-GW is an entity that connects the core network and an external network. Further, the P-GW performs policy control of the core network and a RAN to be provided, charging control, and IP address management in some cases. The S-GW and the P-GW are logically different entities but are physically the same in some cases.

The serving GPRS support node (SGSN) is an entity having both functions of the MME and the S-GW. The SGSN is an entity that exists depending on a type of network (general packet radio services (GPRS)) and a type of RAN (WCDMA (registered trademark)/GMS). The SGSN has both the functions of the MME and the S-GW and therefore deals with both a control plane and a user plane.

The eNBs are logically connected via an X2 interface, are physically connected via the core network, and can communicate with each other.

(2) Paging

Next, paging in LTE will be described.

In LTE, a technology referred to as "paging" is used in order that a network side calls UE that is mainly in an idle mode. Paging is used for, for example, providing reception of data or a voice call and emergency notification such as tsunami warning. Main uses are as follows.

Figure 4:
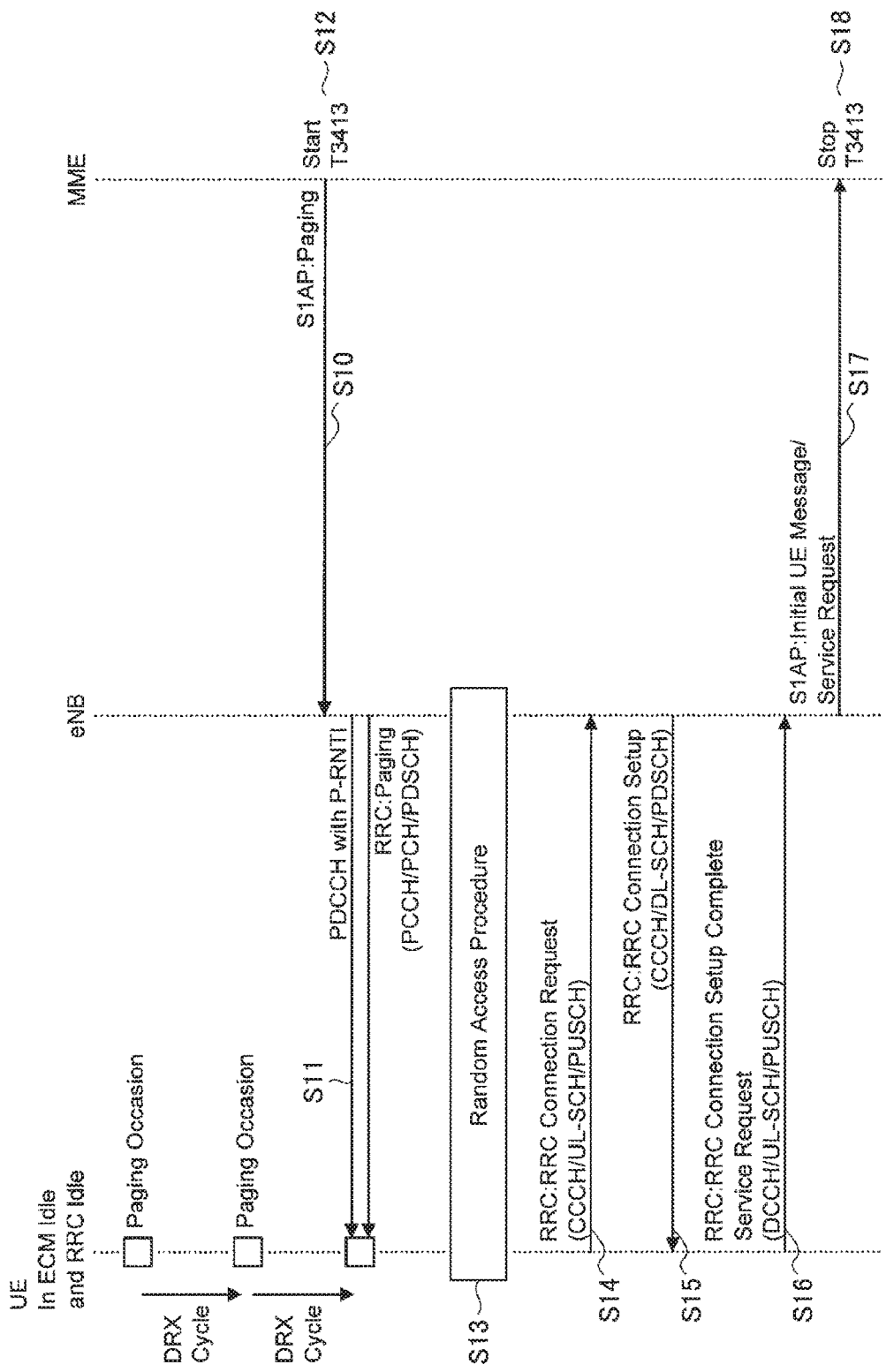
FIG. 4 is a sequence diagram illustrating an example of a flow of a paging procedure.

- To initiate a mobile terminating packet switching (PS) data connection
- To initiate a mobile terminating SMS connection
- To initiate a mobile terminating CS fallback connection
- To trigger a UE to re-acquire system information
- To provide earthquake and tsunami warning system (ETWS) notification
- To provide a commercial mobile alert service (CMAS) notification Hereinafter, an example of a flow of processing according to paging will be described with reference to FIG. 4. FIG. 4 is a sequence diagram illustrating an example of a flow of a paging procedure. UE, an eNB, and an MME are involved in this sequence.

As illustrated in FIG. 4, first, the UE is notified of a paging message (also referred to as "paging signal") from the MME via the eNB (Steps S10, S11). The paging message from the MME to the eNB is also referred to as "S1AP paging message". The paging message from the eNB to the UE is also referred to as "RRC paging message". The MME transmits the S1AP paging message to a plurality of tracking areas (TAs) (Step S10). Each eNB generates an RRC paging message on the basis of the received S1AP paging message and transmits the RRC paging message to the UE (Step S11). Herein, the MME sets a paging timer T3413 at a timing at which the MME transmits the paging message (Step S12).

In a case where the UE finds a paging message addressed to the UE itself, the UE transitions to a random access procedure (Step S13). Then, the UE transmits an RRC connection request to the eNB (Step S14), and RRC connection setup is performed by the eNB (Step S15).

When the RRC connection setup is completed and the UE transitions to an RRC connected state, the UE transmits a service request to the eNB (Step S16). Then, the eNB transmits the service request to the MME. Upon receipt of the service request, the MME stops the paging timer T3413 (Step S18). Note that, in a case where the paging timer T3413 cannot be stopped before expiration thereof, paging fails.

In order to accurately implement paging, the UE needs to appropriately read a paging signal received from the network side. However, in a case where the UE always receives signals from the network side, the UE consumes an enormous amount of power. In view of this, in LTE, a method referred to as "discontinuous reception (DRX)" is employed. The DRX is a system in which discontinuous reception is performed at a given cycle. A default value of an interval is a value set within the following range, which is provided as notification in a system information block type 2 (SIB2).

{32, 64, 128, 256} [Radio Frames]

The UE side can also request the value of the interval from the network side. In this case, an employable value is the same, and the network side is notified by using an "attach request" or a "tracking area update request".

Note that, in a case where both the default value and the value requested by the UE are set, a smaller value is employed.

The UE sets a frame (PF: paging frame) which receives a paging signal on the basis of information such as a paging interval defined in advance and identification information UE_ID of the UE itself. The PF is calculated by, for example, the following mathematical expression.

$$SFN \bmod T = (T/N) \times (UE\_ID \bmod N)$$

T=DRX cycle length radio frames
N=Min (T, nB)
{T, T/2, T/4, T/8, T/16, T32}
nB: broadcast in SIB2
{4T, 2T, T, T/2, T/4, T/8, T/16, T32}
UE_ID=IMSI mod 1024

Next, the UE determines a subframe (PO: paging occasion) which receives a paging signal in the PF. First, the UE calculates parameters Ns and i_s by using the following mathematical expressions. Then, the UE determines the PO with reference to look up tables in the following Table 1 and Table 2.

Ns=Max (1, nB/T)
i_s=Floor (UE_ID/N) mod Ns

TABLE 1

FDD look up table

| | i_s = 0 | i_s = 1 | i_s = 2 | i_s = 3 |
|---|---|---|---|---|
| Ns = 1 | subframe 9 | N/A | N/A | N/A |
| Ns = 2 | subframe 4 | subframe 9 | N/A | N/A |
| Ns = 4 | subframe 9 | subframe 4 | subframe 5 | subframe 9 |

TABLE 2

TDD look up table

| | i_s = 0 | i_s = 1 | i_s = 2 | i_s = 3 |
|---|---|---|---|---|
| Ns = 1 | subframe 0 | N/A | N/A | N/A |
| Ns = 2 | subframe 0 | subframe 5 | N/A | N/A |
| Ns = 4 | subframe 0 | subframe 1 | subframe 5 | subframe 6 |

The parameter Ns is set to be cell specific. A paging capacity is increased as a value of Ns is increased.

A synchronizing signal or system information is included in subframes 0 and 5, and therefore an MBSFN subframe cannot be set. Thus, in a case where paging information is also stored in those subframes, a spec impact is small. However, it is difficult for a cell having a small paging capacity (narrow band) to store the paging information because subframes 0 and 5 already have no resource. Therefore, in a cell having a small paging capacity, the paging information is assigned to subframes other than subframes 0 and 5, in particular, to subframes 4 and 9 (in a case of 4 and 9, the UE can read the synchronizing signal and the system information immediately after paging, which is efficient). Meanwhile, in a cell in which subframes 0 and 5 have a comparatively large resource (large paging capacity), the paging information can be assigned to the subframes 0 and 5.

In a case of TDD, it is necessary to map the paging information on at least a downlink (DL) subframe, and therefore assignment to subframes 0 and 5 that always have a configuration of the DL is performed with the highest priority. In this case, crash of the paging information and the system information is allowed. In a cell having a large paging capacity, it is possible to additionally use subframes 1 and 6. The subframe 1 is a special subframe, and the subframe 6 is a special subframe or a DL subframe. A region of PDCCH is restricted in the special subframe, and therefore the special subframe cannot be used in a cell having a small paging capacity. Therefore, the paging information is assigned only to a cell having a high paging capacity.

1.3. Technical Problem

In paging in current 3GPP, the MME manages a certain set of base stations as a single TA. In a case where the UE has a certain degree of mobility, such a large scale of mobility management in a TA unit is considered to be effective. However, the MME transmits a paging message to target UE in the TA unit, and therefore overhead regarding paging is large.

Herein, when MEC is introduced, a service is provided to UE from an MEC server that is provided in a place near the UE with short delay. In spite of this, for example, a calling request of another UE from the UE reaches a layer of the MME once, and therefore latency is increased.

A system according to an embodiment of the present disclosure has been made in view of the above circumstance.

In the system according to the present embodiment, an idea of MEC is applied to mobility management, and functions of the MME and the HSS are distributed and arranged in positions closer to a user. With this, regarding mobility management, communication having small overhead and small latency is realized.

2. CONFIGURATION OF SYSTEM

2.1. Schematic Configuration

Figure 5:
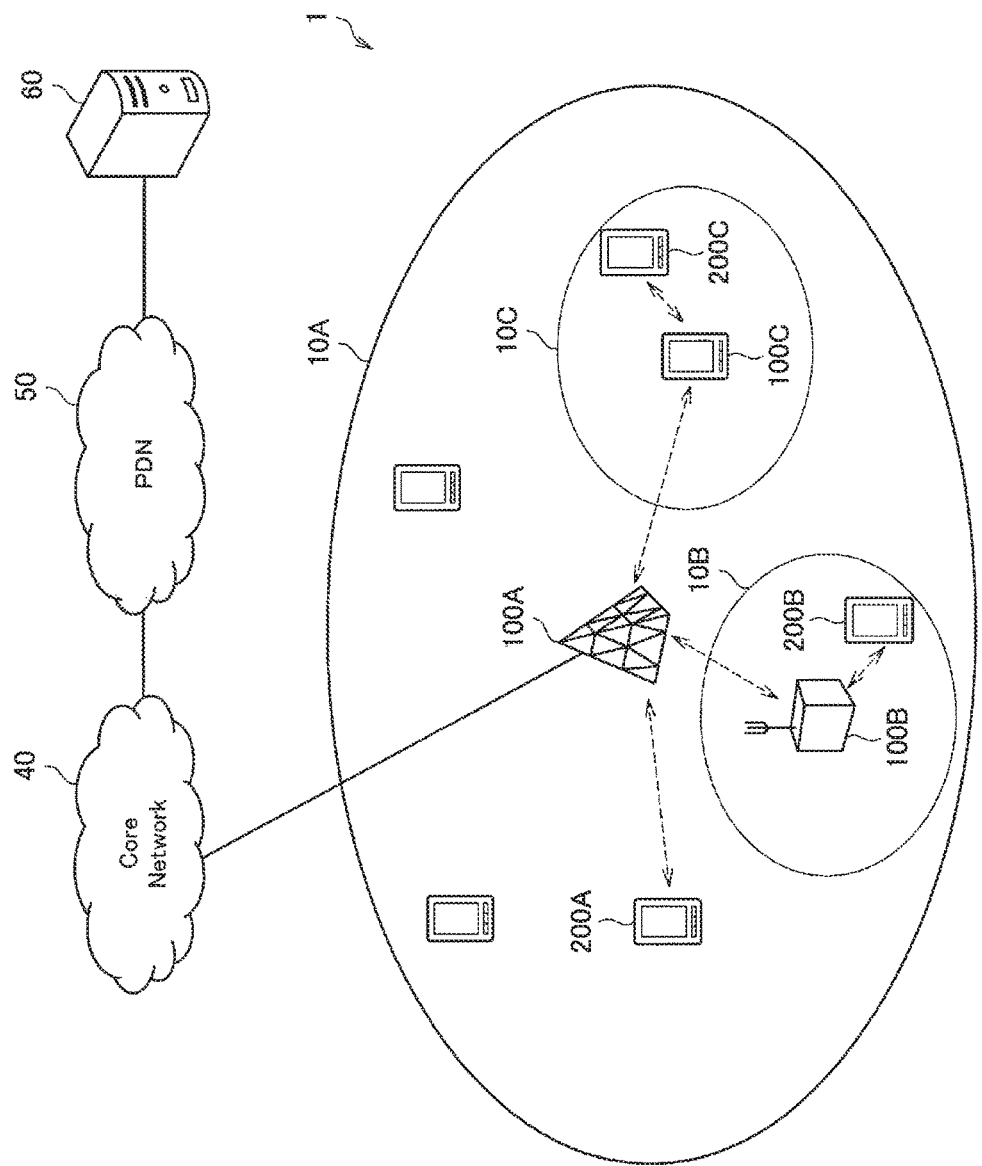
FIG. 5 is an explanatory view illustrating an example of a schematic configuration of a system according to an embodiment of the present disclosure.

Next, a schematic configuration of a system 1 according to the present embodiment will be described with reference to FIG. 5. FIG. 5 is an explanatory view illustrating an example of a schematic configuration of the system 1 according to the present embodiment. When referring to FIG. 5, the system 1 includes a wireless communication device 100, and a terminal device 200. Herein, the terminal device 200 is also referred to as a user. The user may also be referred to as user equipment (UE). The UE herein may be UE defined in LTE or LTE-A, or may more generally mean a communication device.

(1) Wireless Communication Device 100

The wireless communication device 100 is a device that provides a wireless communication service to a device included therein. For example, a wireless communication device 100A is a base station of a cellular system (or mobile communication system). The base station 100A performs wireless communication with a device (e.g., a terminal device 200A) positioned inside a cell 10A of the base station 100A. For example, the base station 100A transmits a downlink signal to the terminal device 200A and receives an uplink signal from the terminal device 200A.

The base station 100A is logically connected to another base station via, for example, an X2 interface and can transmit and receive control information and the like. Further, the base station 100A is logically connected to a core network 40 via, for example, an S1 interface and can transmit and receive control information and the like. Note that communication between those devices may be physically relayed by various devices.

Herein, the wireless communication device 100A illustrated in FIG. 5 is a macro cell base station, and a cell 10 is a macro cell. Meanwhile, wireless communication devices 100B and 10C are master devices that operate small cells 10B and 10C, respectively. As an example, the master device 100B is a small cell base station that is fixedly placed. The small cell base station 100B establishes a wireless backhaul link with the macro cell base station 100A and establishes an access link with one or more terminal devices (e.g., a terminal device 200B) in the small cell 10B. The master device 100C is a dynamic access point (AP). The dynamic AP 100C is a mobile device that dynamically operates the small cell 10C. The dynamic AP 100C establishes a wireless backhaul link with the macro cell base station 100A and establishes an access link with one or more terminal devices (e.g., a terminal device 200C) in the small cell 10C. The dynamic AP 100C may be, for example, a terminal device in which hardware or software that can operate as a base station or wireless access point is provided. The small cell 10C in this case is a localized network that is dynamically formed.

The cell 10 may be operated in accordance with an arbitrary wireless communication method such as LTE, LTE-Advanced (LTE-A), GSM (registered trademark), UMTS, W-CDMA, CDMA200, WiMAX, WiMAX2, or IEEE 802.16.

Note that the small cell is a concept that may encompass various types of cells (e.g., a femto cell, a nano cell, a pico cell, and a micro cell) which are smaller than the macro cell and are arranged to be overlapped with the macro cell or not to be overlapped therewith. In a certain example, the small cell is operated by a dedicated base station. In a different example, the small cell is operated by causing a terminal device serving as a master device to temporarily operate as a small cell base station. A so-called relay node can also be considered to be a form of a small cell base station.

(2) Terminal Device 200

The terminal device 200 can communicate in a cellular system (or mobile communication system). The terminal device 200 performs wireless communication with a wireless communication device (e.g., the base station 100A or the master device 100B or 100C) in the cellular system. For example, the terminal device 200A receives a downlink signal from the base station 100A and transmits an uplink signal to the base station 100A.

(3) Application Server 60

An application server 60 is a device that provides a service to the user. The application server 60 is connected to a packet data network (PDN) 50. Meanwhile, the base station 100 is connected to the core network 40. The core network 40 is connected to the PDN 50 via a gateway device (not illustrated). Therefore, the wireless communication device 100 provides a service provided by the application server 60 to the user via the packet data network 50, the core network 40, and a wireless communication path.

2.2. Detailed Configuration

Figure 6:
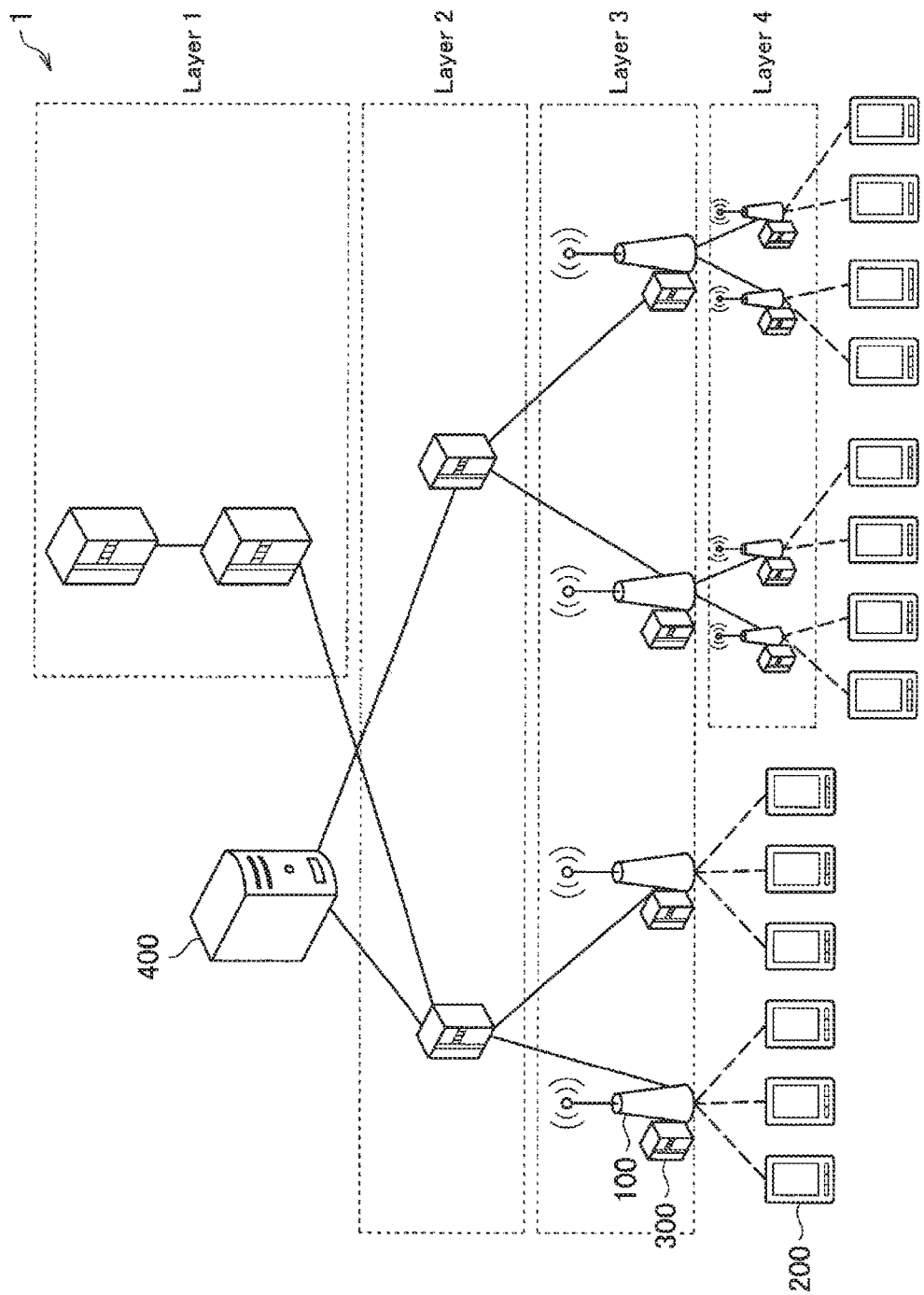
FIG. 6 is an explanatory view illustrating an example of a detailed configuration of the system according to this embodiment.

Next, a detailed configuration of a system 1 according to the present so embodiment will be described with reference to FIG. 6. FIG. 6 is an explanatory view illustrating an example of the detailed configuration of the system 1 according to the present embodiment. As illustrated in FIG. 6, the system 1 includes a plurality of management devices 300 and a coordinator 400.

The management device 300 is a device that performs mobility management of a terminal device 200. The management device 300 may have, for example, at least a part of the function of the MME. The management device 300 may further have at least a part of the function of the HSS. The management device 300 may be realized as a logical function entity or may be integrally provided with an arbitrary communication node such as a wireless communication device 100.

As illustrated in FIG. 6, the system 1 has a layered structure made up of the plurality of management devices 300. A layer 1 is a top layer, and a lower layer is closer to the user. The management devices 300 in the layer 1 are provided in, for example, the core network. For example, the management devices 300 in the layer 1 include at least one of the MME and the HSS. In the example illustrated in FIG. 6, one of the management devices 300 in the layer 1 is the HSS and the other one thereof is the MME. The management devices 300 in a layer 2 are provided in, for example, a relay station on a backhaul link. The management devices 300 in a layer 3 are provided in, for example, macro cell base stations 100. The management devices 300 in a layer 4 are provided in, for example, master devices 100 (for example, small cell base stations or moving cells).

A relationship between the management devices 300 in the layers is as follows: a management area of the management device 300 in an upper layer includes a management area of the management device 300 in a lower layer. The management area means a paging area or a tracking area. For example, the management device 300 provided in the small cell base station 100 sets a small cell of the small cell base station 100 as the management area. Further, the management device 300 provided in the macro cell base station 100 sets a macro cell of the macro cell base station 100 and small cells of one or more small cell base stations 100 connected to the macro cell as the management area. As described above, the management device 300 in the upper layer has a wider management area.

The coordinator 400 is a coordinated control device that controls processing for allowing the plurality of management devices 300 to coordinately manage information of a plurality of terminal devices 200. More specifically, the coordinator 400 assists the management devices 300 to exchange information and share roles. The coordinator 400 may be realized as a logical function entity or may be integrally provided with an arbitrary communication node such as the wireless communication device 100 or the management device 300. Further, in FIG. 6, the coordinator 400 is connected to the management devices 300 in the layer 2. However, the present technology is not limited to such an example. For example, the coordinator 400 may be connected to the management device 300 in an arbitrary layer, may be provided in each layer, or may be provided in each area.

3. CONFIGURATION OF EACH DEVICE

Figure 7:
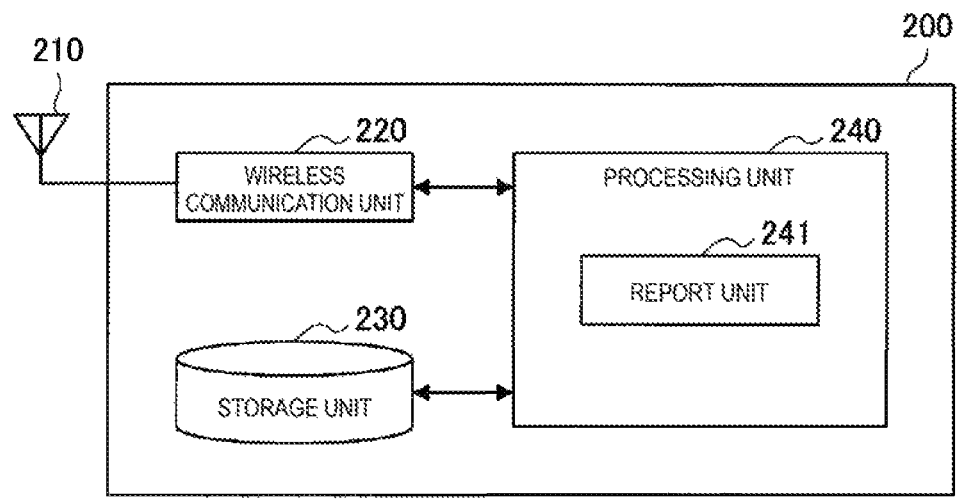
FIG. 7 is a block diagram illustrating an example of a configuration of a terminal device according to this embodiment.
Figure 8:
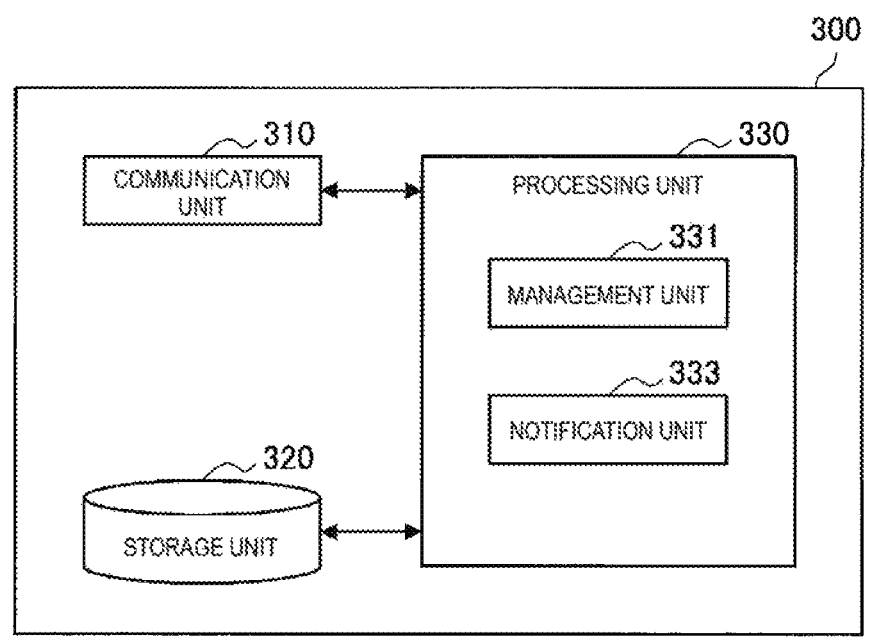
FIG. 8 is a block diagram illustrating an example of a configuration of a management device according to this embodiment.
Figure 9:
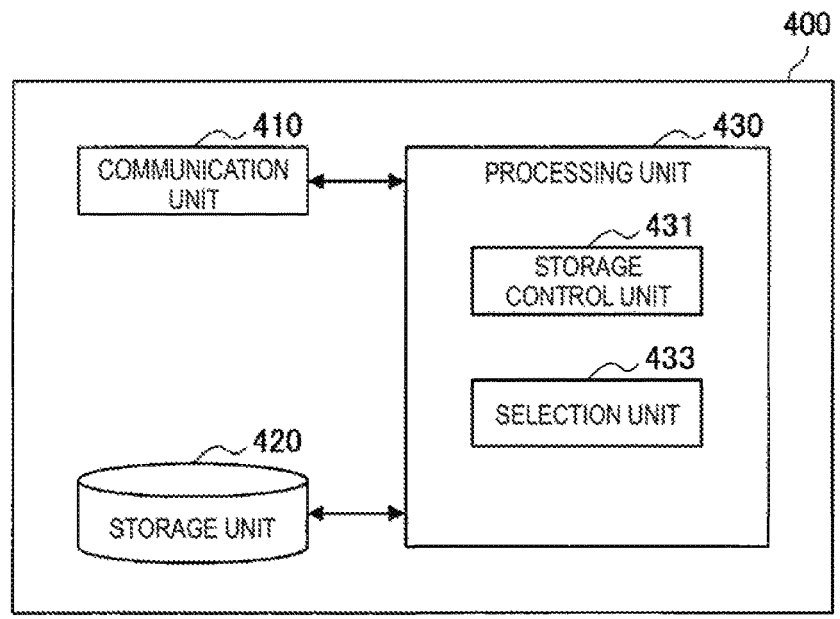
FIG. 9 is a block diagram illustrating an example of a configuration of a coordinator according to this embodiment.

Next, configurations of the terminal device 200, the management device 300, and the coordinator 400 according to the present embodiment will be described with reference to FIGS. 7 to 9.

3.1. Configuration of Terminal Device

First, an example of a configuration of the terminal device 200 according to the present embodiment will be described with reference to FIG. 7. FIG. 7 is a block diagram illustrating an example of the configuration of the terminal device 200 according to the present embodiment. When referring to FIG. 7, the terminal device 200 includes an antenna unit 210, a wireless communication unit 220, a storage unit 230, and a processing unit 240.

(1) Antenna Unit 210

The antenna unit 210 emits a signal output by the wireless communication unit 220 to a space as a radio wave. In addition, the antenna unit 210 converts a radio wave in a space into a signal and outputs the signal to the wireless communication unit 220.

(2) Wireless Communication Unit 220

The wireless communication unit 220 transmits and receives a signal. For example, the wireless communication unit 220 receives a downlink signal from a base station or a master device and transmits an uplink signal to a base station or a master device.

(3) Storage Unit 230

The storage unit 230 temporarily or permanently stores programs and various kinds of data for operation of the terminal device 200.

(4) Processing Unit 240

The processing unit 240 provides various functions of the terminal device 200. The processing unit 240 includes a report unit 241. Note that the processing unit 240 may further include other constituent elements in addition to this constituent element. That is, the processing unit 240 may also perform not only operation of this constituent element but also operation of other constituent elements.

Operation of the report unit 241 will be described in detail below.

3.2. Configuration of Management Device

Next, an example of a configuration of the management device 300 according to the present embodiment will be described with reference to FIG. 8. FIG. 8 is a block diagram illustrating an example of the configuration of the management device 300 according to the present embodiment. When referring to FIG. 8, the management device 300 includes a communication unit 310, a storage unit 320, and a processing unit 330.

(1) Communication Unit 310

The communication unit 310 transmits and receives signals. For example, the communication unit 310 performs communication with the corresponding wireless communication device 100. In a case where the management device 300 is provided as a logical entity and is included in the wireless communication device 100, the communication unit 310 performs communication with, for example, the processor of the wireless communication device 100.

(2) Storage Unit 320

The storage unit 320 temporarily or permanently stores programs and various kinds of data for operation of the management device 300.

(3) Processing Unit 330

The processing unit 330 provides various functions of the management device 300. The processing unit 330 includes a management unit 331, and a notification unit 333. Note that the processing unit 330 may further include other constituent elements in addition to those constituent elements. That is, the processing unit 330 may also perform not only operation of those constituent elements but also operation of other constituent elements.

Operation of the management unit 331, and the notification unit 333 will be described in detail below.

3.3. Configuration of Coordinator

Next, an example of a configuration of the coordinator 400 according to the present embodiment will be described with reference to FIG. 9. FIG. 9 is a block diagram illustrating an example of the configuration of the coordinator 400 according to the present embodiment. When referring to FIG. 9, the coordinator 400 includes a communication unit 410, a storage unit 420, and a processing unit 430.

(1) Communication Unit 410

The communication unit 410 transmits/receives signals. For example, the communication unit 410 communicates with the management device 300. In a case where the coordinator 400 is formed as a logical entity and is included in the wireless communication device 100, the communication unit 410 communicates with, for example, the processor of the wireless communication device 100. Further, in a case where the coordinator 400 is formed as a logical entity and is included in the management device 300, the communication unit 410 communicates with, for example, the processing unit 330.

(2) Storage Unit 420

The storage unit 420 temporarily or permanently stores programs and various kinds of data for operation of the coordinator 400.

(3) Processing Unit 430

The processing unit 430 provides various functions of the coordinator 400. The processing unit 430 includes a storage control unit 431 and a selection unit 433. Note that the processing unit 430 may further include other constituent elements in addition to those constituent elements. That is, the processing unit 430 may perform not only operation of those constituent elements but also operation of other constituent elements.

Operation of the storage control unit 431 and the selection unit 433 will be described in detail below.

4. TECHNICAL FEATURES

Next, technical features of the system 1 according to the present embodiment will be described.

(1) Management of Information

The management device 300 (for example, the management unit 331) manages information of one or more terminal devices 200 positioned in the management area. Management herein encompasses storage of information and update of the stored information. The information managed by the management device 300 will also be referred to as "management information".

The terminal device 200 is managed by one or more management devices 300 that include a position of the terminal device itself in the management areas. The management device 300 may avoid overlap of a management target with another management device 300. For example, among the terminal devices 200 positioned in the management area of the management device itself, the management device 300 (for example, the management unit 331) may set, as a management target, the terminal device 200 that is not a management target of another management device 300 in a lower layer. Note that setting the terminal device 200 as a management target indicates that management information of the terminal device 200 is managed. That is, the management device 300 stores/updates management information of the terminal device 200 serving as a management target. Furthermore, setting the terminal device 200 as a management target may indicate that the management device 300 serves as a transmission source of a paging message.

The management device 300 (for example, the management unit 331) may acquire the management information from the MME or the HSS. Further, the management device 300 may acquire the management information from another management device 300. Further, the terminal device 200 (for example, the report unit 241) may report the management information of the terminal device itself to the management device 300 that sets the terminal device itself as a management target.

(2) Content of Management Information

The management information includes at least one of mobility information of the terminal device 200, information on an application used by the terminal device 200, and attribute information of the terminal device 200. With this, the terminal device 200 can be under management of the management device 300 in a layer suitable for a characteristic of the terminal device itself.

The mobility information may include at least one of position information, speed, and a moving direction of the terminal device 200. With this, it is possible to predict the management device 300 that manages a management area of a moving destination and make notification or the like in advance.

The attribute information may include a terminal category such as whether the terminal device 200 is an MTC device or a smartphone. With this, it is possible to predict a level of mobility, and thus the terminal device 200 can be under management of the management device 300 in an appropriate layer.

(3) Sharing

The coordinator 400 assists a plurality of management devices 300 to share roles.

For example, the coordinator 400 (for example, the selection unit 433) may select the terminal device 200 serving as a management target of each management device 300 on the basis of the management information. For example, the coordinator 400 may perform selection on the basis of the attribute information of the terminal device 200. More specifically, the coordinator 400 sets the terminal device 200 having a low mobility, such as an MTC device, as a management target of the management device 300 in a lower layer and sets the terminal device 200 having a high mobility, such as an in-vehicle device, as a management target of the management device 300 in a upper layer. In addition, the coordinator 400 may perform selection on the basis of the application used by the terminal device 200. For example, in a case where an application in which communication is performed in a local area, such as a fighting game, is used, the coordinator 400 sets the terminal device 200 as a management target of the management device 300 in the lower layer. Similarly, the coordinator 400 may perform selection on the basis of the mobility information of the terminal device 200. As described above, the coordinator 400 can assign management of the terminal device 200 to the management device 300 that matches a characteristic of the terminal device 200.

For example, the coordinator 400 (for example, the storage control unit 431) may store (that is, causes the storage unit 420 to store) information indicating the layered structure and the terminal device 200 serving as a management target of each management device 300. More simply, the coordinator 400 grasps which management device 300X) in which layer manages which terminal device 200. The information indicating the layered structure is information indicating a relationship between the management devices 300. The information indicating the terminal device 200 serving as a management target of each management device 300 is information indicating a relationship between the management device 300 and the terminal device 200. On the basis of the above information, the coordinator 400 can accurately transmit/receive a message in the system 1. Hereinafter, the information stored by the coordinator 400 will also be referred to as "tree information".

The coordinator 400 (for example, the storage control unit 431) updates the tree information. For example, the coordinator 400 may update the tree information in accordance with movement of the terminal device 200. With this, the coordinator 400 can accurately grasp a management target of the management device 300. Further, the coordinator 400 may update the tree information in accordance with a change of the layered structure. With this, the coordinator 400 can accurately grasp the layered structure.

(4) Mobility Management

The management device 300 performs various types of processing for mobility management.

For example, the management device 300 (for example, the management unit 331) performs an attach procedure. For example, the management device 300 receives an attach request signal from the terminal device 200 positioned in the so management area and performs user authentication and bearer setting on the basis of authentication information possessed by the management device itself or acquired from the HSS.

For example, the management device 300 (for example, the management unit 331) performs a paging procedure. For example, the management device 300 transmits a paging message to the terminal device 200 serving as a management target and receives a service request. Note that paging performed by the management device 300 according to the present embodiment will also be referred to as "local paging" in some cases.

In LTE, the paging timer T3413 has been used in the MME as a threshold for determining success/failure of paging. Meanwhile, in the present embodiment, a timer (hereinafter, also referred to as "local paging timer") is used instead of the paging timer T3413. In a case where elapsed time from transmission of a paging message exceeds the local paging timer, the management device 300 (for example, the management unit 331) recognizes a possibility of movement of the terminal device 200 serving as a management target to the outside of the management area. Note that the possibility of the movement means that there is a possibility of moving or having moved.

In addition, the management device 300 (for example, the management unit 331) may recognize the possibility of the movement of the terminal device 200 on the basis of information of the terminal device 200. For example, the management device 300 determines a possibility that the terminal device 200 may move to the outside of the management area of the management device itself (that is, may deviate) on the basis of the mobility information, an attribute of the terminal device 200, a used application, and the like. With this, the management device 300 can recognize the possibility of the movement before the terminal device 200) actually moves to the outside of the management area.

In a case where the possibility of the movement of the terminal device 200 serving as the management target to the outside of the management area is recognized, the management device 300 (for example, the notification unit 333) notifies other management devices 300 in the same layer or an upper layer of information indicating the possibility of the movement of the terminal device 200. With this, the possibility of the movement is widely known by the surrounding management devices 300. Note that a notification destination may be controlled by the coordinator 400. For example, the management device 300 may inquire of the coordinator which another management device 300 should be notified and make notification on the basis of a result of the inquiry. In addition, notification may be relayed by the coordinator 400.

In a case where the management device 300 (for example, the management unit 331) is notified of information indicating the possibility of the movement of the terminal device 200 from another management device 300, the management device 300 may transmit a paging message to the terminal device 200. For example, on the basis of notification from another management device 300 in the lower layer, the management device 300 performs a paging procedure with respect to a management area wider than a management area in the lower layer. With this, the system 1 can search the terminal device 200 within a minimum range at first and then search the terminal device 200 while gradually increasing the range. It is possible to early find the terminal device 200 having low mobility in particular. Note that, in a case where the range is gradually increased, the management device 300 that has been searched once (whose search has failed) may be excluded from a search target. Further, in a case where a plurality of management devices 300 perform paging, timings of the respective management devices 300 are desirably shifted to prevent collision.

Note that the local timer may be different in each layer. Further, the local timer is desirably shorter than the paging timer T3413. This is because paging may be performed a plurality of times. Furthermore, it is desirable that the sum total of local paging timers from the bottom layer to the top layer match the paging timer T3413 or be equal or less than the paging timer T3413. This is because paging may be performed while the range is being increased by raising the layer one by one.

The management device 300 (for example, the notification unit 333) notifies, of the management information of the terminal device 200, another management device 300 that manages a management area of a moving destination of the terminal device 200. With this, the management information is taken over from a moving source to the moving destination. Note that the notification destination may be controlled by the coordinator 400. For example, the management device 300 may inquire of the coordinator which another management device 300 should be notified and make notification on the basis of a result of the inquiry. In addition, the notification may be relayed by the coordinator 400. Further, the management device 300 of the moving destination notifies the coordinator 400 that the terminal device 200 that may be newly moved or has been newly moved is set as a management target. With this, the coordinator 400 can grasp a change of the management target of the management device 300.

In a case where movement of the terminal device 200 serving as the management target to the outside of the management area is recognized (that is, in a case where paging performed by another management device 300 succeeds), the management device 300 (for example, the management unit 331) may exclude the moved terminal device 200 from the management target. With this, overlap of the management target is solved. Furthermore, the management information may be deleted in the moving source. However, it is basically desirable to hold the management information in each layer, and therefore it is desirable not to delete the management information (that is, to copy the management information). In other words, the management device 300 that is not a manager may also hold the management information. Note that reliability of the management information may be set in accordance with the number of times of copy, updated date and time, and the like. Further, the management device 300 of the moving source notifies the so coordinator 400 that the moved terminal device 200 has been excluded from the management target. With this, the coordinator 400 can grasp a change of the management target of the management device 300.

Herein, in the above description, there has been described an example in which the management device 300 that performs management is changed from a lower layer to an upper layer in accordance with movement of the terminal device 200. However, there is an opposite example. For example, the manager of the terminal device 200 may be changed from the management device 300 in the upper layer to the management device 300 in the lower layer in accordance with, for example, reduction in mobility.

In implementation of a tracking area (TA) update, the management device 300 (for example, the management unit 331) updates the management information of the terminal device 200 serving as the management target. That is, a plurality of management devices 300 collectively update the management information. Specifically, the management devices 300 recognize movement of the terminal device 200 on the basis of a TA update message and, for example, hand over the management information from the moving source to the moving destination and solve overlap of the management target as described above.

Hereinabove, the technical features of the system 1 according to the present embodiment have been described.

5. PROCESSING FLOWS

Next, an example of a flow of processing of executed in the system 1 according to the present embodiment will be described. First, a basic processing flow will be described, and then a processing flow in a specific use case will be described.

5.1. Basic Processing Flow

First, an example of a flow of processing performed in the coordinator 400 for assisting in paging performed by the management device 300 will be described with reference to FIG. 10.

Figure 10:
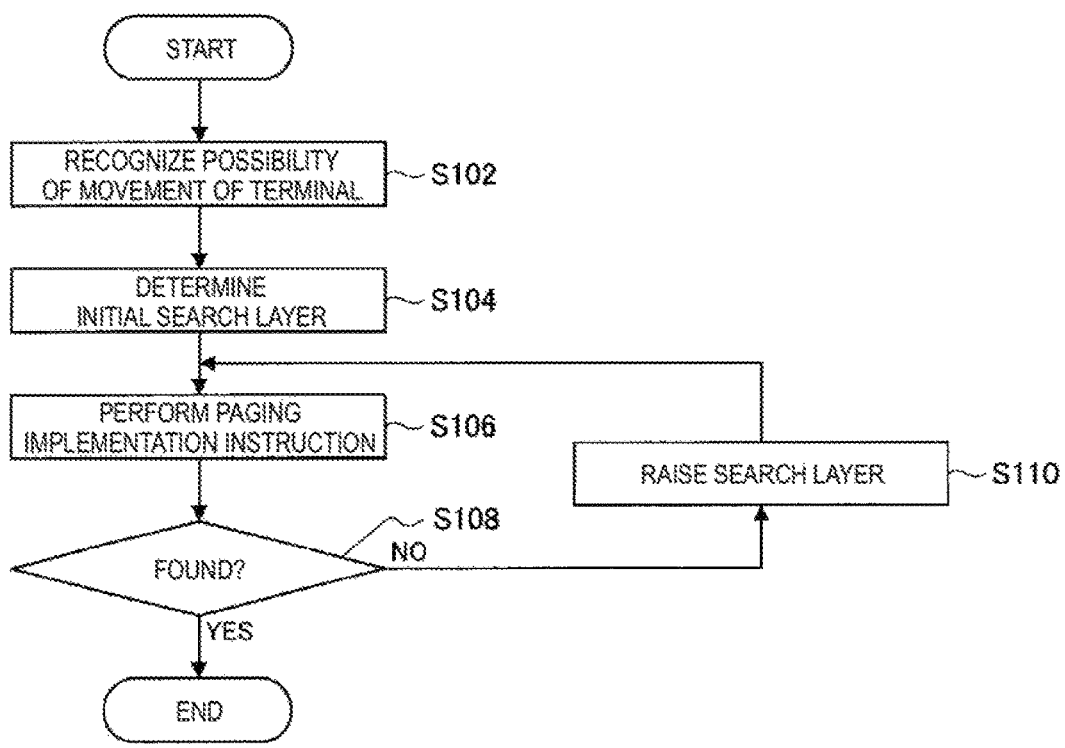
FIG. 10 is a flowchart showing an example of a flow of paging assistance processing executed in the coordinator according to this embodiment.

FIG. 10 is a flowchart showing an example of a flow of paging assistance processing executed in the coordinator 400 according to the present embodiment.

As shown in FIG. 10, first, the coordinator 400 (for example, the selection unit 433) recognizes a possibility of movement of the terminal device 200 (Step S102). For example, in a case where the coordinator 400 receives, from the management device 300, lost notification indicating that the local paging timer has expired, the coordinator 400 recognizes a possibility of movement of the terminal device 200.

Then, the coordinator 400 (for example, the selection unit 433) determines an initial search layer (Step S104) and instructs the management device 300 in the layer to implement paging (Step S106).

In a case where the terminal device 200 is not found (Step S108/NO), the coordinator 400 (for example, the selection unit 433) raises the search layer (Step S110) and instructs the management device 300 to implement paging again (Step S106). The coordinator 400 repeats the above processing until the terminal is found and terminates the processing in a case where the terminal is found (Step S108/YES).

Hereinabove, an example of the flow of the paging assistance processing has been described. Next, an example of a flow of local paging processing performed in the system 1 will be described with reference to FIG. 11.

Figure 11:
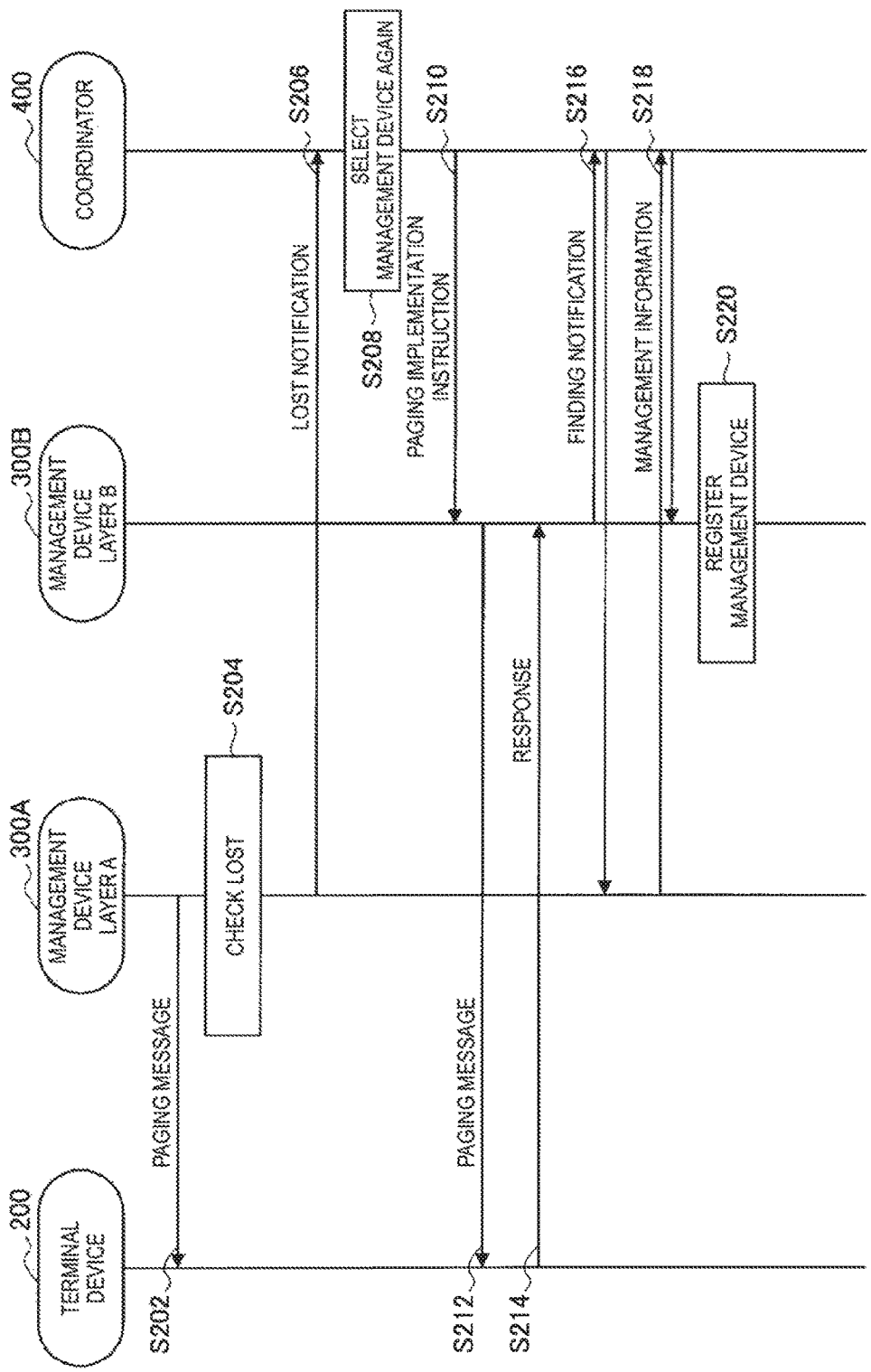
FIG. 11 is a sequence diagram illustrating an example of a flow of local paging processing executed in the system according to this embodiment.

FIG. 11 is a sequence diagram illustrating an example of the flow of the local paging processing executed in the system 1 according to the present embodiment. As illustrated in FIG. 11, the terminal device 200, a management device 300A in a layer A, a management device 300B in a layer B, and the coordinator 400 are involved in this sequence. The layer A is assumed to be lower than the layer B.

First, the management device 300A transmits a paging message to the terminal device 200 (Step S202). Then, the management device 300A confirms that the terminal device 200 has been lost on the basis of expiration of the local paging timer (Step S204) and transmits lost notification to the coordinator 400 (Step S206). Note that the lost notification may include management information (at least a terminal ID) of the lost terminal device 200.

The coordinator 400 selects the management device 300 again (Step S208). For example, the coordinator 400 selects the management device 300B in a layer upper than the layer of the management device 300A. Then, the coordinator 400 transmits a paging implementation instruction to the management device 300B (Step S210).

The management device 300B that has received the paging implementation instruction transmits a paging message to the terminal device 200 (Step S212). When the terminal device 200 succeeds in receiving the paging message, the terminal device 200 transmits a response (Step S214).

The management device 300B that has received the response transmits finding notification to the management device 300A via the coordinator 400 (Step S216). The management device 300A transmits the management information of the terminal device 200 to the management device 300B via the coordinator 400 in response to the finding notification (Step S218). Then, the management device 300B registers the received management information (Step S220).

Hereinabove, an example of the flow of the local paging processing has been described.

5.2. Detailed Processing Flows

Next, detailed processing flows will be described with reference to FIGS. 12 to 16.

(1) Calling in Application Base

First, a use case where the terminal device 200 calls a neighboring terminal device 200 in an application base will be described with reference to FIGS. 12 and 13. This use case corresponds to, for example, a case where neighboring terminal devices 200A and 200B execute a game application that performs communication. In a case where the game application does not cause mobility (for example, a game performed by using local information), it is expected that a moving range is limited to a certain extent. In such a use case, introduction of the management device 300 according to the present embodiment, in which the management area is limited, is effective.

Hereinafter, first, a flow of processing of attach will be described with reference to FIG. 12.

Figure 12:
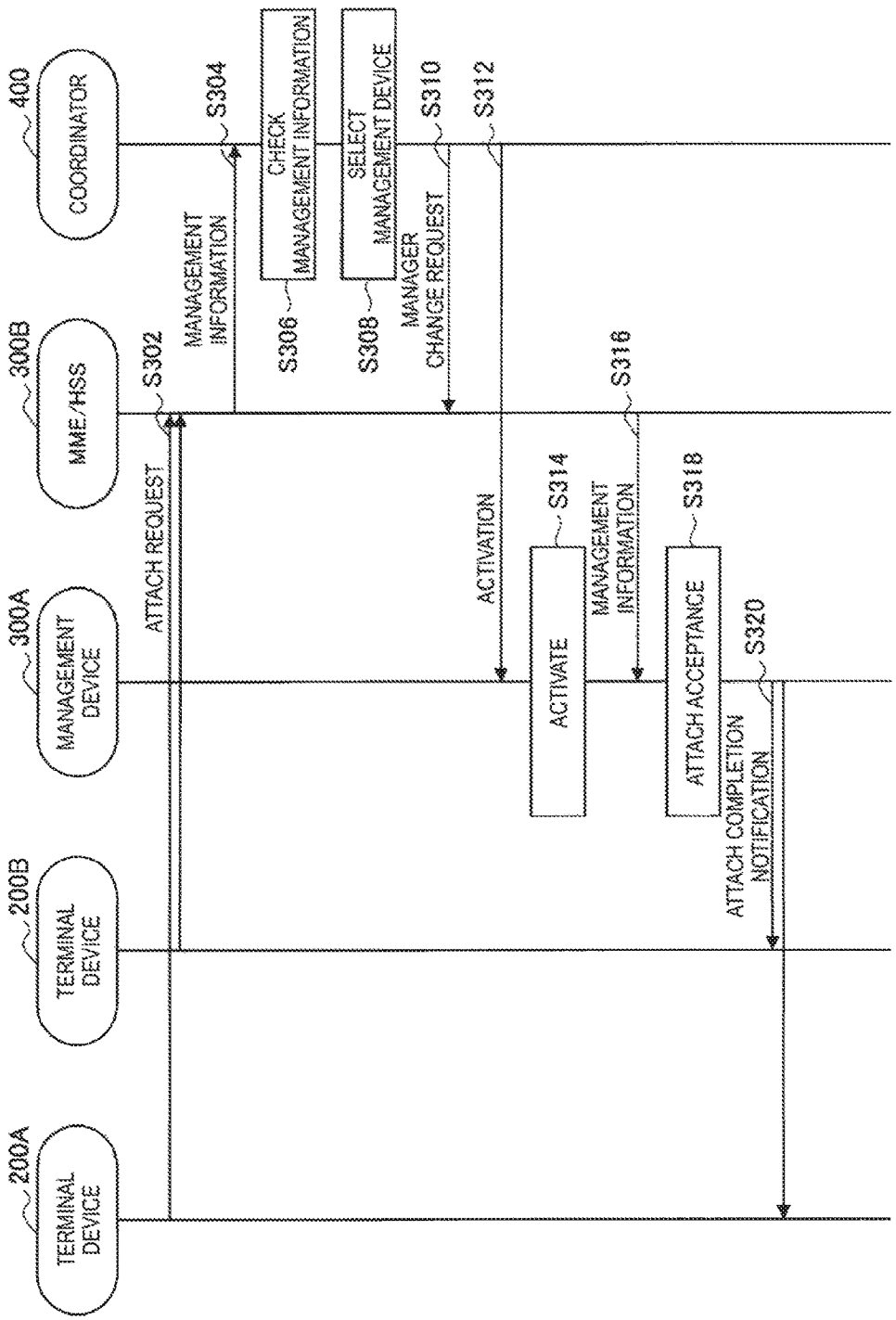
FIG. 12 is a sequence diagram illustrating an example of a flow of attach processing executed in the system according to this embodiment.

FIG. 12 is a sequence diagram illustrating an example of a flow of attach processing executed in the system 1 according to the present embodiment. As illustrated in FIG. 12, the terminal devices 200A and 200B, the management devices 300A and 300B, and the coordinator 400 are involved in this sequence. The management device 300B is assumed to be an MME/HSS in the top layer.

First, the terminal devices 200A and 200B transmit an attach request to the MME/HSS 300B (Step S302). Information on an application to be used is transmitted to the MME/HSS 300B together with or separately from this attach request.

The MME/HSS 300B transmits management information of the terminal 80 devices 200A and 200B to the coordinator 400 (Step S304).

The coordinator 400 confirms the received management information (Step S306) and selects the management device 300 to manage the terminal devices 200A and 200B serving as sources of the attach request (Step S308). For example, on the basis of the information on the application to be used by the terminal devices 200A and 200B, which is included in the management information, the coordinator 400 determines which is appropriate, management by the MME/HSS 300 or management by the management device 300 in the lower layer. For example, in a case where the application is operated only in a specified area, the coordinator 400 determines that management should be performed by the management device 300 in the lower layer. Herein, it is assumed that it is determined that the management device 300A should perform management.

In that case, the coordinator 400 transmits, to the MME/HSS, a manager change request that a manager of the terminal devices 200A and 200B be changed to the management device 300A (Step S310).

Then, the coordinator 400 transmits an activation message to the management device 300A (Step S312). The management device 300A is activated on the basis of the activation message (Step S314). Note that, in a case where the management device 300A has already been activated, the above processing may be omitted.

Next, the management device 300A receives the management information of the terminal devices 200A and 200B from the MME/HSS 300B (Step S316).

Then, the management device 300A performs attach acceptance processing such as bearer setting (Step S318) and transmits attach completion notification to the terminal devices 200A and 200B (Step S320). With this, attach management by the management device 300A is started.

Hereinabove, an example of the flow of the attach processing has been described.

Note that there has been described an example in which the information on the application to be used by the terminal device 200 is provided from the terminal device 200 side in Steps S302 and 304 in the above sequence. However, the present technology is not limited to such an example. For example, the application information may be provided from an application layer (for example, the application server 60 or MEC server).

Next, an example of a flow of processing of local paging will be described with reference to FIG. 13. In more detail, there will be described local paging processing performed in a case where the terminal device 200B calls the terminal device 200A that has transitioned to an idle mode. Similar processing may be performed in a paging procedure in, for example, update of system information, in addition to a case where a terminal device calls a terminal device. Note that FIG. 13 illustrates an example in which paging by the management device 300A succeeds. An example in which paging by the management device 300A fails will be described in detail below with reference to FIG. 14.

Figure 13:
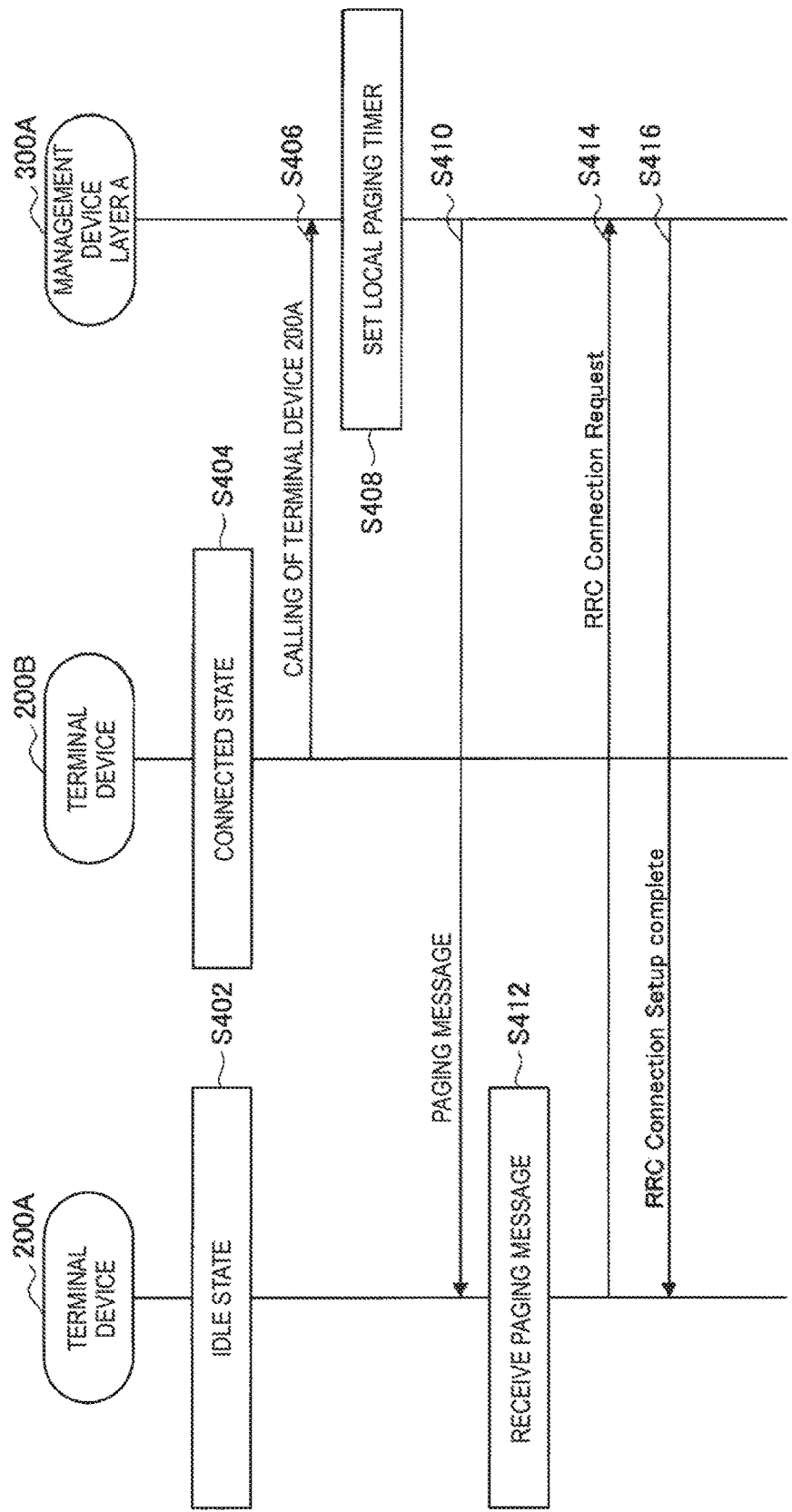
FIG. 13 is a sequence diagram illustrating an example of a flow of local paging processing executed in the system according to this embodiment.

FIG. 13 is a sequence diagram illustrating an example of a flow of the local paging processing executed in the system 1 according to the present embodiment. As illustrated in FIG. 13, the terminal devices 200A and 200B and the management device 300A in the layer A are involved in this sequence. The layer A is assumed to be lower than the layer B.

As illustrated in FIG. 13, the terminal device 200A is in an idle state (Step S402), and the terminal device 200B is in a connected state (Step S404). First, the terminal device 200B performs calling of the terminal device 200A with respect to the management device 300A (Step S406).

Then, the management device 300A sets a local paging timer (Step S408) and transmits a paging message to the terminal device 200A (Step S410).

Upon receipt of the paging message (Step S412), the terminal device 200A transmits an RRC connection request to the management device 300A (Step S414). Then, the management device 300A transmits an RRC connection setup complete to the terminal device 200A (Step S416).

Thus, the processing is terminated.

(2) Search while Increasing Search Range

Figure 14:
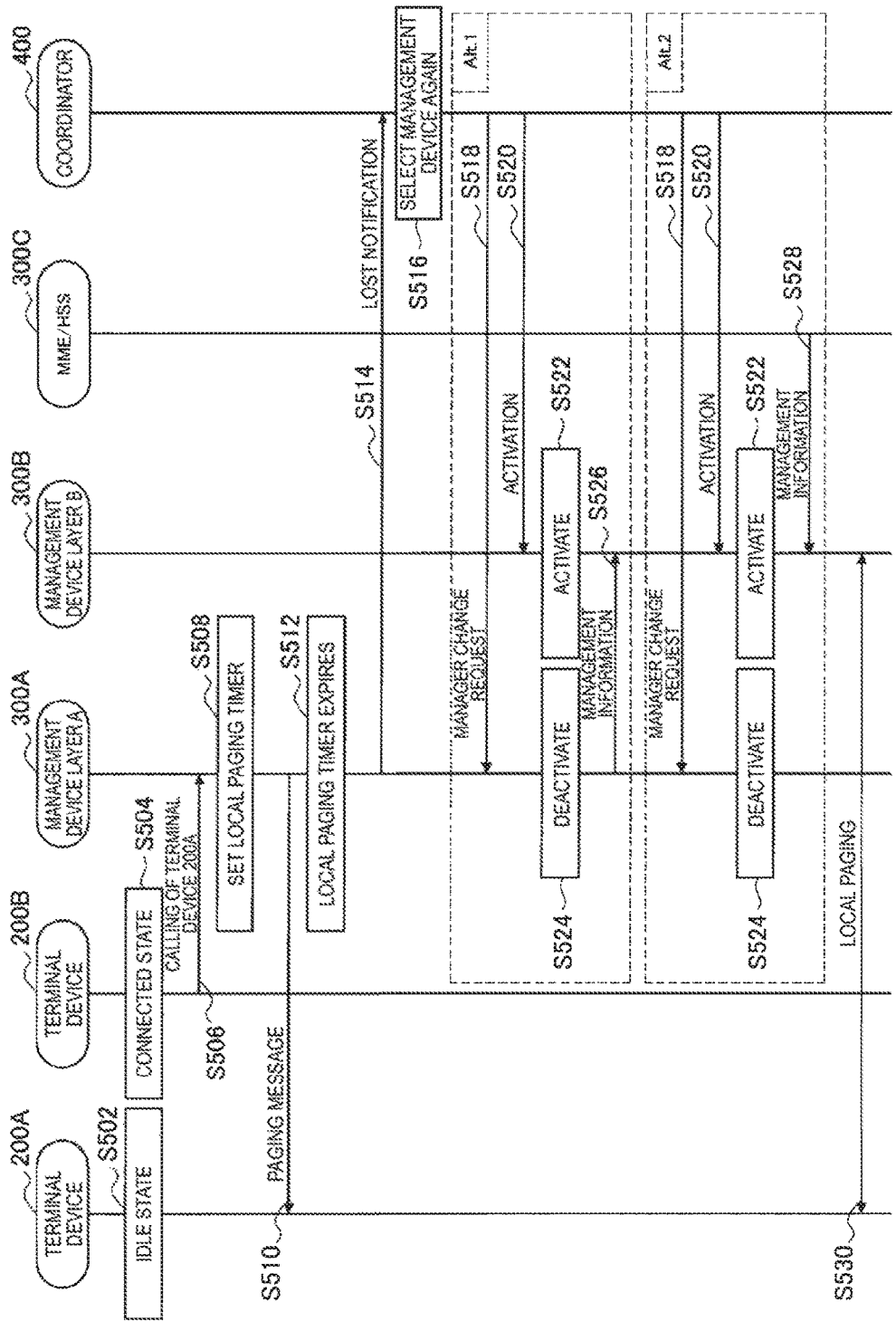
FIG. 14 is a sequence diagram illustrating an example of a flow of local paging processing executed in the system according to this embodiment.
Figure 15:
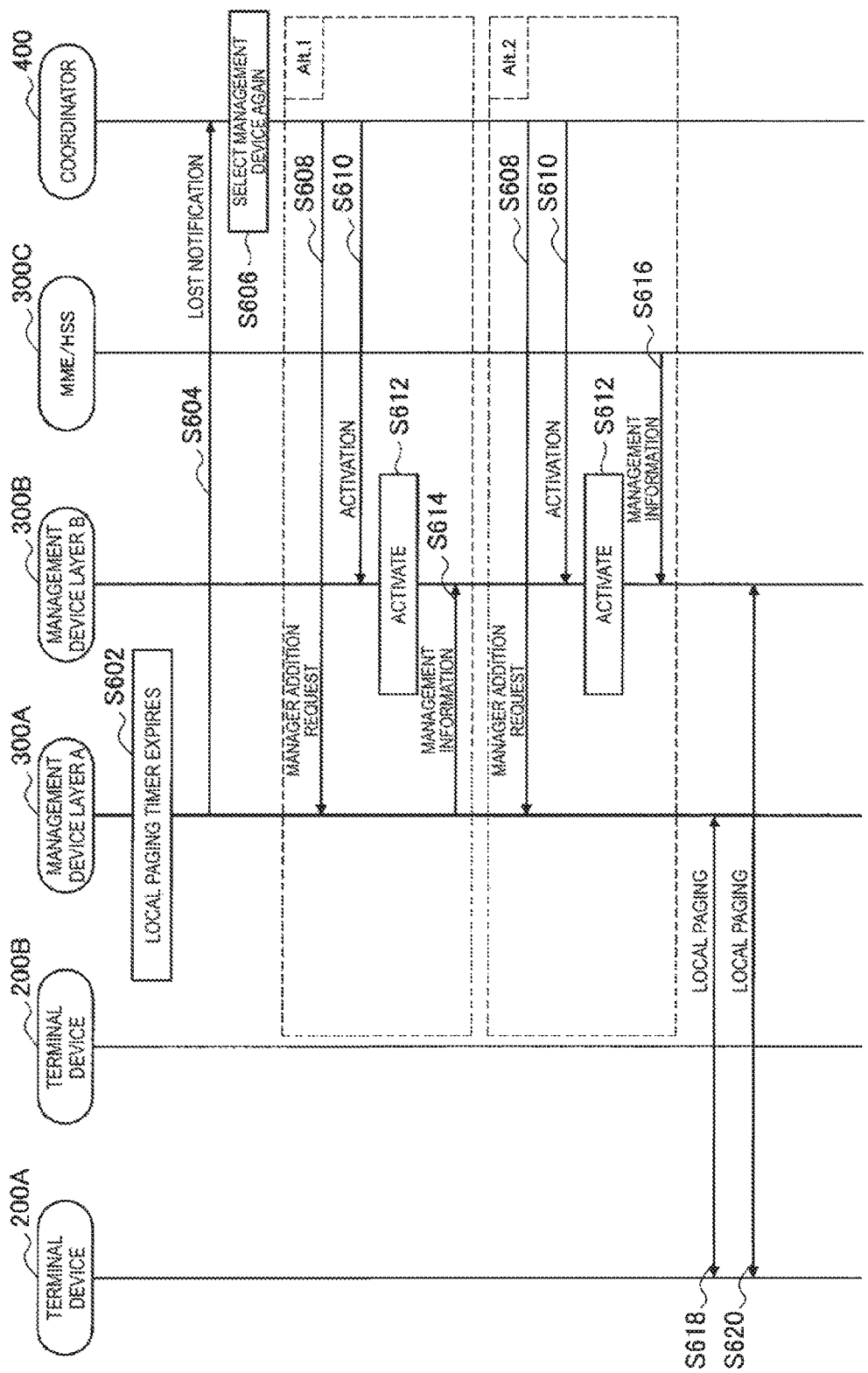
FIG. 15 is a sequence diagram illustrating an example of a flow of local paging processing executed in the system according to this embodiment.

Next, a use case where the terminal device 200 is searched while a search range is being increased will be described with reference to FIGS. 14 and 15. Note that FIG. 14 is an example in which the management device 300 that has been searched once (whose search has failed) is excluded from a search target and search is performed in a new search range. FIG. 15 is an example in which the management device 300 that has been searched once (whose search has failed) is not excluded from a search target and a new search range is added. Further, FIG. 14 is an example in which search is performed while a layer is being raised, and FIG. 15 is an example in which search is performed in the same layer. In a case where a rough position is already known because a moving direction or the like has already been known, search is desirably performed in the same layer in which the position is included in a management area. In both FIGS. 14 and 15, there will be described an example in which paging by the management device 300A fails in the case described above with reference to FIG. 13.

FIG. 14 is a sequence diagram illustrating an example of a flow of the local paging processing executed in the system 1 according to the present embodiment. As illustrated in FIG. 14, the terminal devices 200A and 200B, the management device 300A in the layer A, the management device 300B in the layer B, an MME/HSS 300C, and the coordinator 400 are involved in this sequence. The layer A is assumed to be lower than the layer B.

As illustrated in FIG. 14, processing in Steps S502 to S510 is similar to the processing in Steps S402 to S410 described above with reference to FIG. 13.

When the local paging timer expires (Step S512), the management device 300A transmits lost notification to the coordinator 400 (Step S514).

Then, the coordinator 400 selects the management device 300 again (Step S516). For example, the coordinator 400 selects the management device 300B in a layer upper than the layer of the management device 300A.

In that case, the coordinator 400 transmits, to the management device 300A, a manager change request that the manager of the terminal device 200A be changed to the management device 300B (Step S518). Then, the coordinator 400 transmits an activation message to the management device 300B (Step S520). The management device 300B is activated on the basis of the activation message (Step S522). Meanwhile, the management device 300A is deactivated on the basis of the manager change request (Step S524) and transmits management information of the terminal device 200A to the management device 300B (Step S526). With this, the manager of the terminal device 200A is changed to the management device 300B.

As alternative processing (Alt.2) of the processing in Steps S518 to S526 (Alt.1), the management information may be transmitted from the MME/HSS 300C to the management device 300B (Step S528).

Then, local paging is performed between the management device 300B and the terminal device 200A (Step S530). Note that, in a case where local paging by the management device 300B also fails, the coordinator 400 causes a further upper or surrounding management device 300 to perform local paging. Such local paging is repeated until the terminal device 200 is found or the MME/HSS in the top layer performs local paging.

Thus, the processing is terminated.

FIG. 15 is a sequence diagram illustrating an example of a flow of the local paging processing executed in the system 1 according to the present embodiment. As illustrated in FIG. 15, the terminal devices 200A and 200B, the management device 300A in the layer A, the management device 300B in the layer A, the MME/HSS 300C, and the coordinator 400 are involved in this sequence.

As illustrated in FIG. 15, the processing in Step S502 to S510 described above with reference to FIG. 13 is omitted in this sequence. As illustrated in FIG. 15, when the local paging timer expires (Step S602), the management device 300A transmits lost notification to the coordinator 400 (Step S604).

Then, the coordinator 400 selects the management device 300 again (Step S606). For example, the coordinator 400 selects the management device 300B that is in the same layer as the layer of the management device 300A and includes a rough position of the terminal device 200A in the management area.

In that case, the coordinator 400 transmits, to the management device 300A, a manager addition request that the management device 300B be added as the manager of the terminal device 200A (Step S608). Then, the coordinator 400 transmits an activation message to the management device 300B (Step S610). The management device 300B is activated on the basis of the activation message (Step S612). Meanwhile, the management device 300A transmits the management information of the terminal device 200A to the management device 300B on the basis of the manager addition request (Step S614). With this, the management device 300B is added as the manager of the terminal device 200A.

As alternative processing (Alt.2) of the processing in Steps S608 to S614 (Alt.1), the management information may be transmitted from the MME/HSS 300C to the management device 300B (Step S616).

Then, local paging is performed between the management device 300A and the terminal device 200A (Step S618), and, furthermore, local paging is performed between the management device 300B and the terminal device 200A (Step S620).

Thus, the processing is terminated.

(3) Change of Manager According to Characteristic of Terminal Device

Next, a use case where a manager is changed in accordance with a characteristic of the terminal device 200 will be described with reference to FIG. 16. For example, the terminal device 200 having a high moving speed is desirably a management target of the management device 300 having a wide management area, i.e., the management device 300 in an upper layer. On the contrary, the terminal device 200 having a low moving speed is desirably a management target of the management device 300 having a narrow management area, i.e., a management target of the management device 300 in a lower layer. As described above, the coordinator 400 assigns an appropriate management device 300 to the terminal device 200 in accordance with the characteristic of the terminal device 200. Hereinafter, there will be described an example in which the manager of the terminal device 200 having a high moving speed is changed from the management device 300 in the lower layer to the management device 300 in the upper layer.

Figure 16:
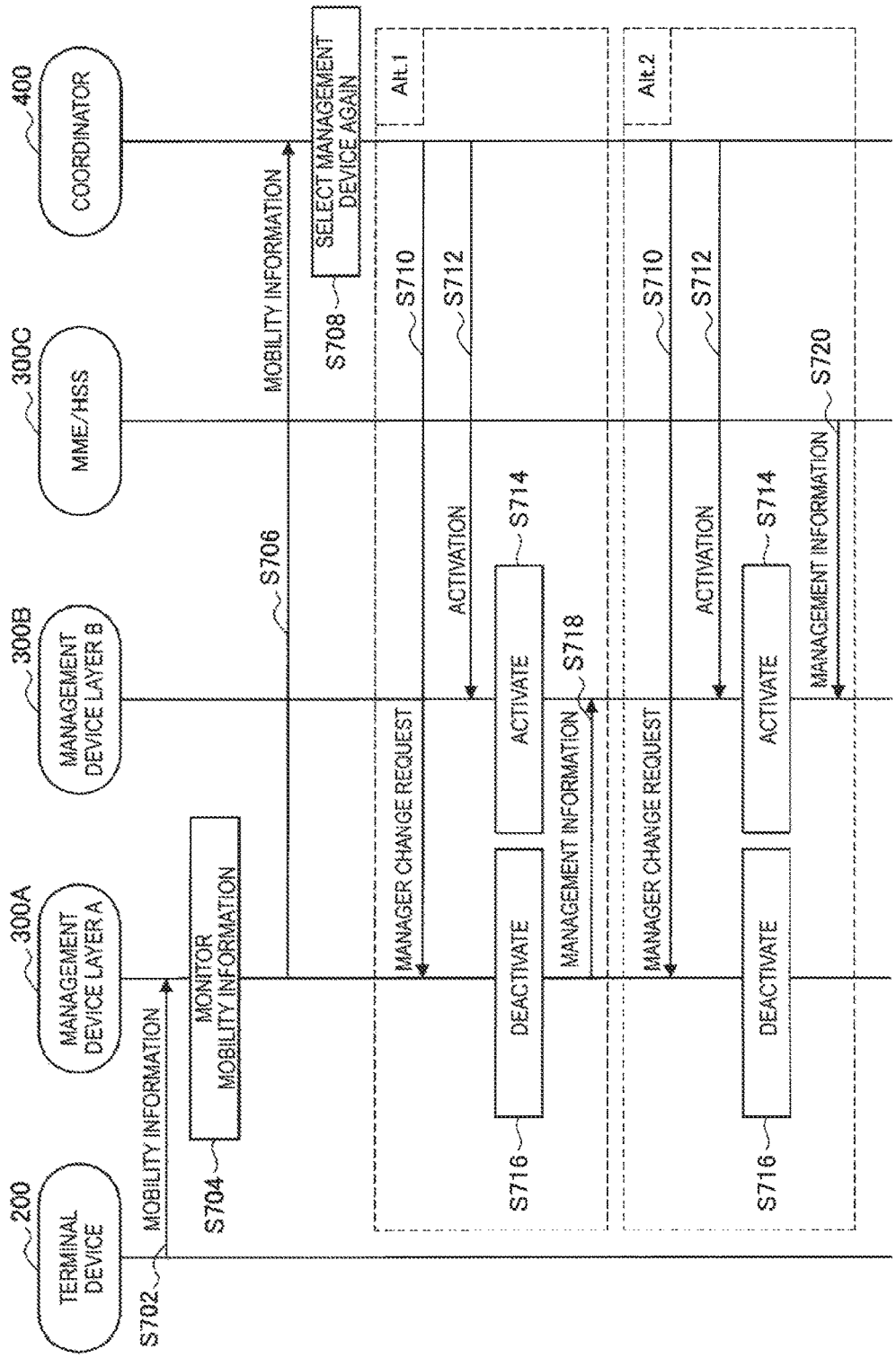
FIG. 16 is a sequence diagram illustrating an example of a flow of change processing of a manager executed in the system according to this embodiment.

FIG. 16 is a sequence diagram illustrating an example of a flow of change processing of a manager executed in the system 1 according to the present embodiment. As illustrated in FIG. 16, the terminal device 200, the management device 300A in the layer A, the management device 300B in the layer B, the MME/HSS 300C, and the coordinator 400 are involved in this sequence. The layer A is assumed to be lower than the layer B.

As illustrated in FIG. 16, first, the terminal device 200 transmits mobility information of the terminal device itself to the management device 300A (Step S702). For example, the terminal device 200 acquires information indicating speed, a moving direction, and a geographical position by using various sensors and reports the above information to the management device 300A.

The management device 300A monitors the mobility information received from the terminal device 200 (Step S704), and, in a case where the mobility information satisfies a predetermined condition, transmits the mobility information of the terminal device 200 to the coordinator 400 (Step S706). The predetermined condition is such that, for example, the moving speed exceeds a predetermined threshold. This is because, in a case where a moving speed is high, a possibility that the terminal device 200 moves to the outside of the management area of the management device 300A in the lower layer is increased.

Then, the coordinator 400 selects the management device 300 again (Step S708). For example, the coordinator 400 selects the management device 300B in a layer upper than the layer of the management device 300A.

Processing in steps S710 to S718 (Alt.1) and Steps S710 to S720 (Alt.2) thereafter is similar to the processing in Steps S518 to S526 (Alt.1) and Steps S518 to S528 (Alt.2) described above with reference to FIG. 14. With this, the manager of the terminal device 200A is changed to the management device 300B.

Thus, the processing is terminated.

6. APPLICATION EXAMPLES

The technology of the present disclosure can be applied to various products. For example, the management device 300 and the coordinator 400 may be realized as a server of any type such as a tower server, a rack server, a blade server, or the like. In addition, at least a part of constituent elements of the management device 300 and the coordinator 400 may be realized in a module mounted in a server (e.g., an integrated circuit module configured in one die or a card or a blade inserted into a slot of a blade server). Further, the management device 300 and the coordinator 400 may be realized as any type of eNB (evolved Node B) such as a macro eNB or a small eNB.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least a part of the constituent elements of the terminal device 200 may be realized in a module mounted in such a terminal (for example, an integrated circuit module configured in one die).

6.1. Application Example with Regard to Management Device and Coordinator

Figure 17:
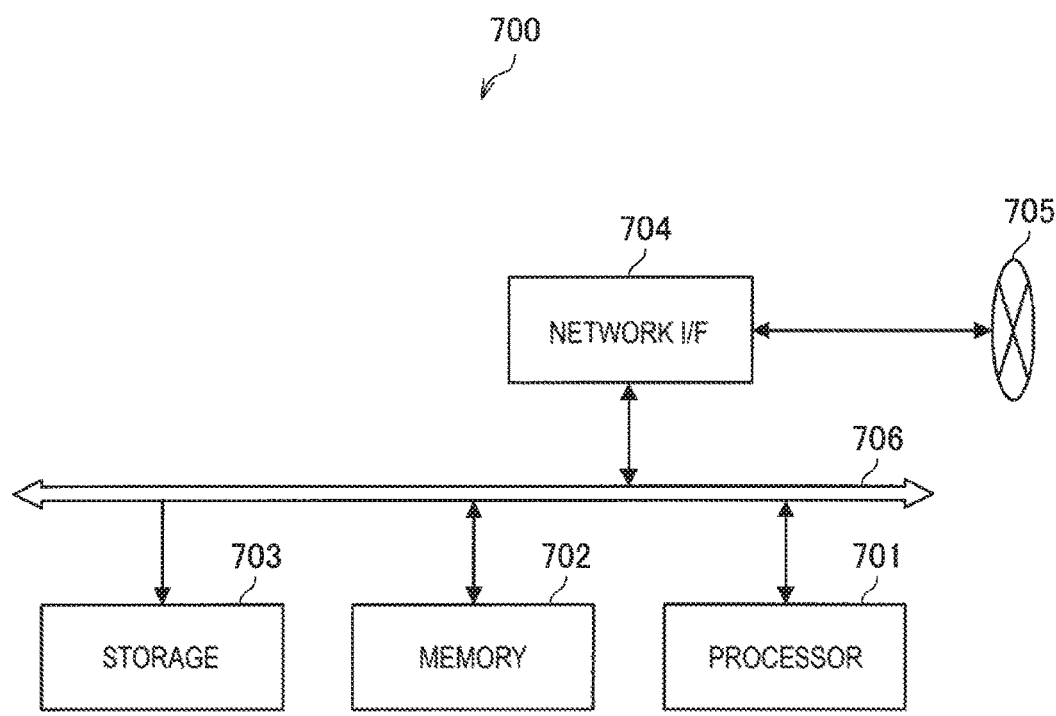
FIG. 17 is a block diagram illustrating an example of a schematic configuration of a server.

FIG. 17 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 17, one or more constituent elements included in the management device 300 described with reference to FIG. 8 (the management unit 331 and/or the notification unit 333) may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the above-described one or more constituent elements as described above, or the program for causing a processor to function as the one or more constituent elements may be provided. In addition, a readable recording medium in which the program is recorded may be provided.

In addition, in the server 700 shown in FIG. 17, the communication unit 310 described with reference to FIG. 8, for example, may be implemented by the network I/F 704. Moreover, the storage unit 320 may be implemented by the memory 702 or the storage 703.

In the server 700 illustrated in FIG. 17, one or more constituent elements included in the coordinator 400 described with reference to FIG. 9 (the storage control unit 431 and/or the selection unit 433) may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the above-described one or more constituent elements as described above, or the program for causing a processor to function as the one or more constituent elements may be provided. In addition, a readable recording medium in which the program is recorded may be provided.

In addition, in the server 700 shown in FIG. 17, the communication unit 410 described with reference to FIG. 9, for example, may be implemented by the network I/F 704. Moreover, the storage unit 420 may be implemented by the memory 702 or the storage 703.

6.2. Application Example with Regard to Terminal Device

First Application Example

Figure 18:
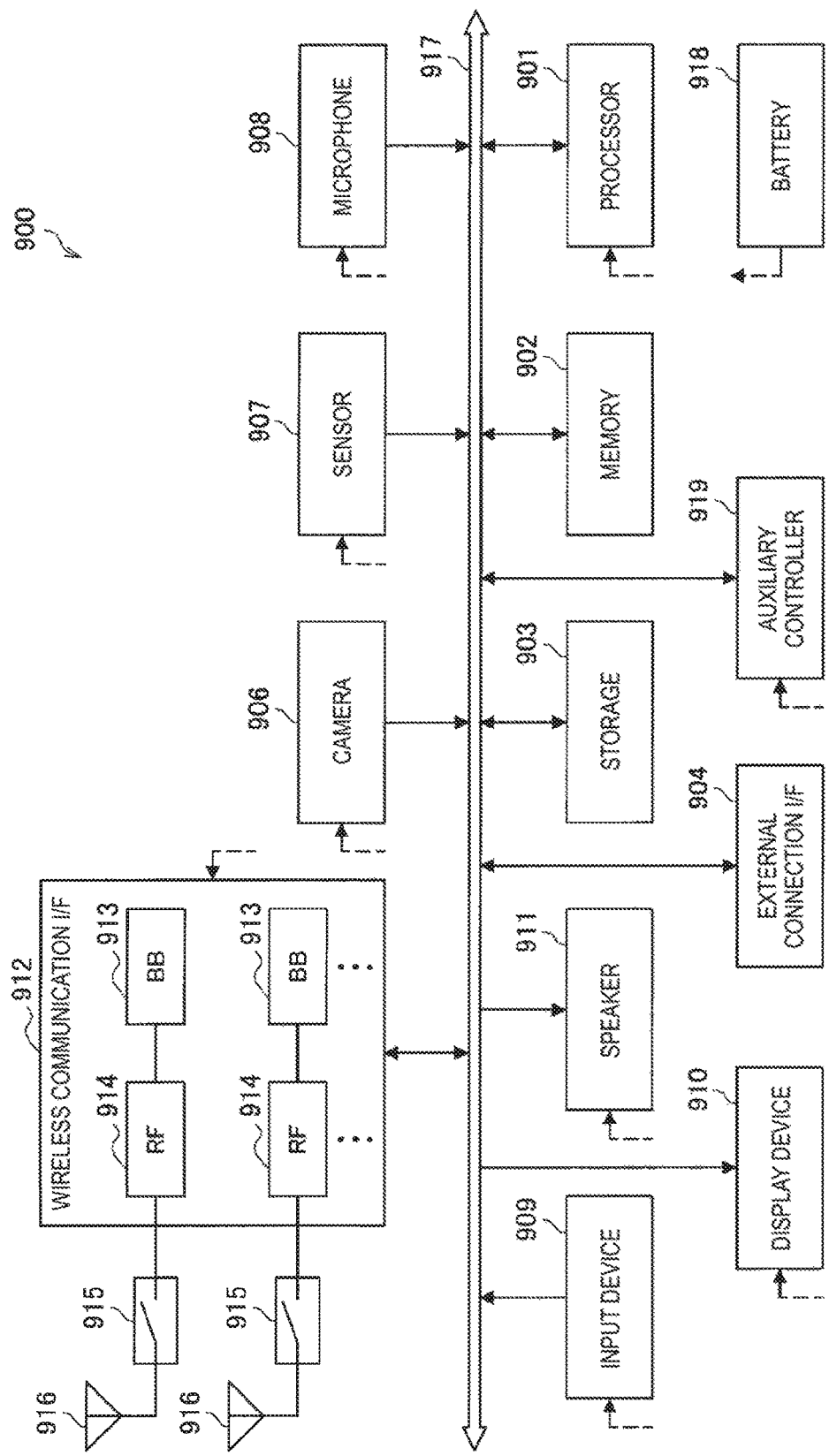
FIG. 18 is a block diagram illustrating an example of a schematic configuration of a smartphone.

FIG. 18 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), so and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900) to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 18. Although FIG. 18 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 18. Although FIG. 18 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 18 via feeder lines, which are partially shown as dashed lines in the figure. The auxiliary controller 919 operates a minimum necessary function of the smartphone 900, for example, in a sleep mode.

In the smartphone 900 shown in FIG. 18, one or more constituent elements included in the terminal device 200 (the report unit) described with reference to FIG. 7 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the one or more constituent elements may be provided. In addition, a readable recording medium in which the program is recorded may be provided.

In addition, in the smartphone 900 shown in FIG. 18, the wireless communication unit 220 described with reference to FIG. 7, for example, may be implemented by the wireless communication interface 912 (for example, the RF circuit 914). Moreover, the antenna unit 210 may be implemented by the antenna 916. In addition, the storage unit 230 may be implemented by the memory 902.

Second Application Example

Figure 19:
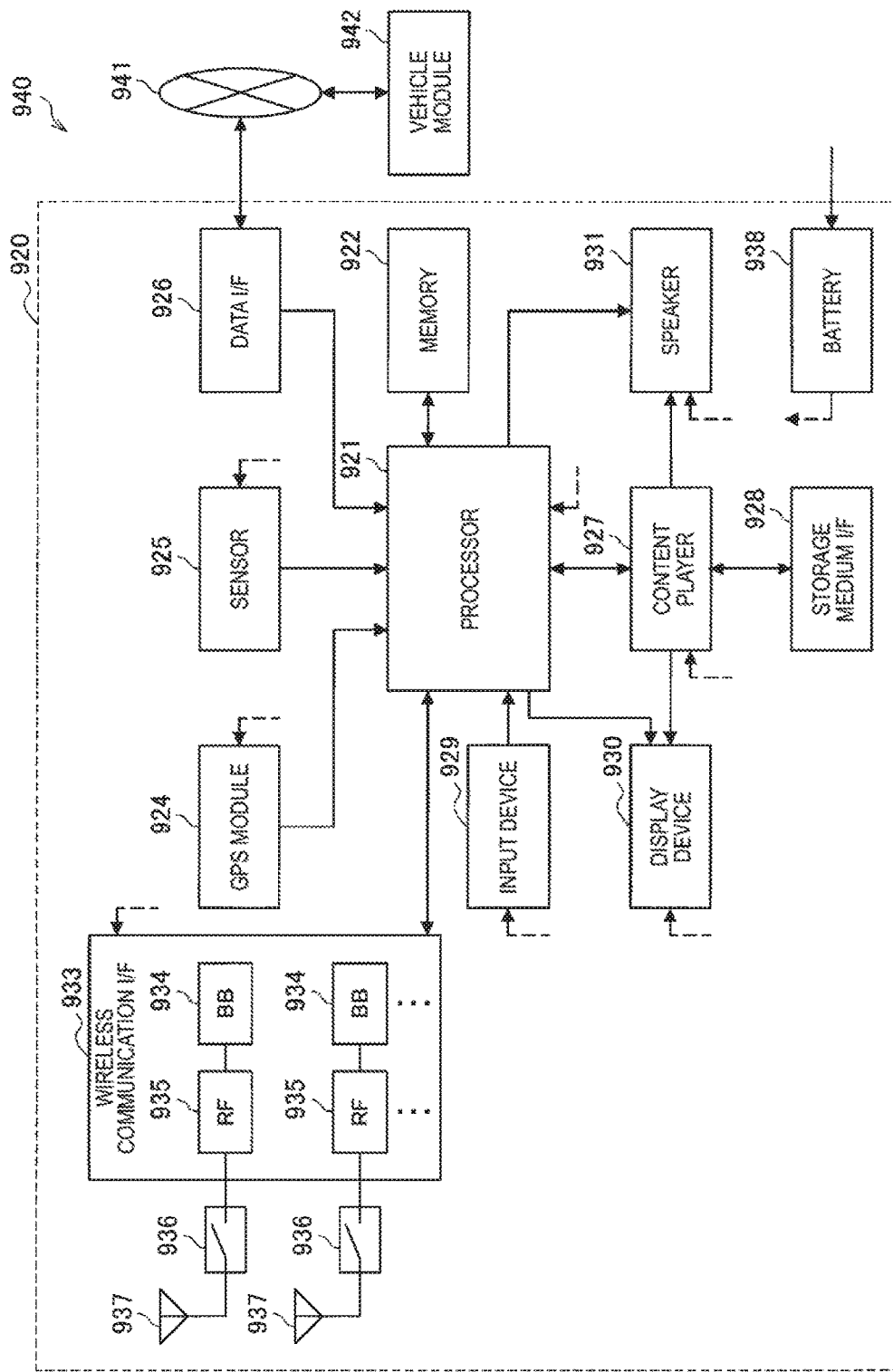
FIG. 19 is a block diagram illustrating an example of a schematic configuration of a car navigation device.

FIG. 19 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 19. Although FIG. 19 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 19. Although FIG. 19 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 19 via feeder lines that are partially shown as dashed lines in the figure. The battery 938 accumulates power supplied form the vehicle.

In the car navigation device 920 shown in FIG. 19, one or more constituent elements included in the terminal device 200 (the report unit 241) described with reference to FIG. 7 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the car navigation device 920, and the wireless communication interface 933 (for example, the BB processor 934) and/or the processor 921 may execute the program. As described above, the car navigation device 920 or the module may be provided as a device which includes the one or more constituent elements, and the program for causing the processor to function as so the one or more constituent elements may be provided. In addition, a readable recording medium in which the program is recorded may be provided.

In addition, in the car navigation device 920 shown in FIG. 19, the wireless communication unit 220 described with reference to FIG. 7, for example, may be implemented by the wireless communication interface 933 (for example, the RF circuit 935). Moreover, the antenna unit 210 may be implemented by the antenna 937. In addition, the storage unit 230 may be implemented by the memory 922.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the report unit 241. The vehicle module 942 generates vehicle data such as vehicle speed, engine speed, and trouble information, and outputs the generated data to the in-vehicle network 941.

7. CONCLUSION

Hereinabove, an embodiment of the present disclosure has been described in detail with reference to FIGS. 1 to 19. As described above, in the system 1 according to the present embodiment, the terminal device 200 is managed by the plurality of management devices 300 having a layered structure in which a management area of the management device 300 in an upper layer includes a management area of the management device 300 in a lower layer. With such a system, it is possible to perform mobility management of the terminal device 200 in a distributed manner. In more detail, the management device 300 in an appropriate layer, which is based on mobility of the terminal device 200, a characteristic of a used application, and the like, manages the terminal device 200. With this, more precise mobility management is realized, as compared to unified management by the MME/HSS. Furthermore, exchange of messages in paging or the like can be performed without transmitting a signal to the MME/HSS, and therefore it is possible to remarkably reduce overhead and latency regarding the mobility management.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that it is not necessary for the processes described in this specification with reference to the flowchart and the sequence diagram to be executed in the order shown in the flowchart. Some processing steps may be performed in parallel. Further, some of additional steps can be adopted, or some processing steps can be omitted.

Further, it is also possible to prepare a computer program for causing a processor (for example, CPU, DSP, or the like) included in a device in this specification (for example, a base station, a base station device or a module for the base station device, or a terminal device or a module for the terminal device) to function as a constituent element of the above device (for example, the processing unit 240, the processing unit 330, the processing unit 430, or the like) (in other words, a computer program for causing the above processor to execute operation of the constituent element of the above device). Further, a recording medium in which the computer program is recorded may also be provided. Further, a device including a memory for storing the above computer program and one or more processors capable of executing the above computer program (for example, a base station, a base station device or a module for the base station device, or a terminal device or a module for the terminal device) may also be provided. Further, a method including operation of the constituent element of the above device (for example, the processing unit 240, the processing unit 330, the processing unit 430, or the like) is also encompassed in the technology according to the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A system including a plurality of management devices configured to manage information of one or more terminal devices positioned in management areas, in which the plurality of management devices have a layered structure in which the management area of the management device in an upper layer includes the management area of the management device in a lower layer.

(2)

The system according to (1), in which in a case where a possibility of movement of the terminal device serving as a management target to outside of the management area is recognized, the management device notifies another one of the management devices in a same layer or an upper layer of information indicating the possibility of the movement of the terminal device.

(3)

The system according to (2), in which in a case where elapsed time from transmission of a paging message exceeds a threshold, the management device recognizes the possibility of the movement of the terminal device serving as the management target to the outside of the management area.

(4)

The system according to (2) or (3), in which the management device recognizes the possibility of the movement of the terminal device on the basis of the information of the terminal device.

(5)

The system according to any one of (2) to (4), in which the management device notifies, of the information of the terminal device, the other management device that manages a management area of a moving destination of the terminal device.

(6)

The system according to any one of (2) to (5), in which in a case where the management device is notified, from the other management device, of the information indicating the possibility of the movement of the terminal device, the management device transmits a paging message to the terminal device.

(7)

The system according to any one of (1) to (6), in which the information of the terminal device managed by the management device includes at least one of mobility information of the terminal device, information on an application used by the terminal device, and attribute information of the terminal device.

(8)

The system according to (7), in which the mobility information includes at least one of position information, speed, and a moving direction of the terminal device.

(9)

The system according to any one of (1) to (8), in which the terminal device is managed by the one or more management devices including a position of the terminal device itself in the management areas.

(10)

The system according to (9), in which the management device sets, as a management target, the terminal device that is not a management target of another one of the management devices in a lower layer among the terminal devices positioned in the management area of the management device itself.

(11)

The system according to any one of (1) to (10), in which the management device in a top layer includes at least one of a mobility management entity (MME) and a home subscriber server (HSS).

(12)

The system according to any one of (1) to (11), in which in implementation of a tracking area (TA) update, the management device updates the information of the terminal device serving as a management target.

(13)

The system according to any one of (1) to (12), further including a coordinated control device configured to control processing for allowing the plurality of management devices to coordinately manage the information of the plurality of terminal devices.

(14)

The system according to (13), in which the coordinated control device selects the terminal device serving as a management target of each of the management devices on the basis of the information of the terminal devices.

(15)

The system according to (13) or (14), in which the coordinated control device stores information indicating the layered structure and the terminal device serving as a management target of each of the management devices.

(16)

The system according to (15), in which the coordinated control device updates the stored information in accordance with movement of the terminal device.

(17)

The system according to (15) or (16), in which the coordinated control device updates the stored information in accordance with a change of the layered structure.

(18)

A method including in a case where a management device included in a system including a plurality of management devices configured to manage information of one or more terminal devices positioned in management areas and having a layered structure in which the management area of the management device in an upper layer includes the management area of the management device in a lower layer recognizes a possibility of movement of the terminal device serving as a management target to outside of the management area, notifying another one of the management devices in a same layer or an upper layer of information indicating the possibility of the movement of the terminal device.

(19)

A terminal device managed by a system including a plurality of management devices configured to manage information of one or more terminal devices positioned in management areas and having a layered structure in which the management area of the management device in an upper layer includes the management area of the management device in a lower layer.

REFERENCE SIGNS LIST 1 system
10 cell
40 core network 50 packet data network
60 application server
100 wireless communication device
200 terminal device
210 antenna unit
220 wireless communication unit
230 storage unit
240 processing unit
241 report unit
300 management device
310 communication unit
320 storage unit
330 processing unit
331 management unit
333 notification unit
400 coordinator
410 communication unit
420 storage unit
430 processing unit
431 storage control unit
433 selection unit

The invention claimed is:

1. A system comprising
a plurality of management devices configured to manage information of one or more terminal devices positioned in management areas, wherein
the plurality of management devices have a layered structure in which the management area of the management device in an upper layer comprises the management areas of more than one of the management devices in a lower layer,
the plurality of management devices being configured such that upon determination of a possibility of movement of a managed terminal device of the one or more terminal devices serving as a management target from a first one of the management areas of the lower layer to another of the management layers in the lower layer, management of the managed terminal device is changed from the lower layer to the upper layer,
wherein the determination of the possibility of movement is made when an elapsed time from transmission of a paging message in the first one of the management areas of the lower layer exceeds a threshold without receiving a response from the terminal device.

2. The system according to claim 1, wherein
upon the determination of the possibility of the movement of the managed terminal device, a management device currently managing the managed terminal device notifies another one of the management devices in a same layer or the upper layer of information indicating the possibility of the movement of the managed terminal device.

3. The system according to claim 2, wherein
in a case where the elapsed time from transmission of the paging message exceeds the threshold, the management device currently managing the managed terminal device recognizes the possibility of the movement of the terminal device serving as the management target to the outside of the management area.

4. The system according to claim 2, wherein
the management device currently managing the managed terminal device recognizes the possibility of the movement of the managed terminal device on the basis of the information of the terminal device.

5. The system according to claim 2, wherein
the management device currently managing the managed terminal device notifies, of the information of the terminal device, the other management device that manages the management area of a moving destination of the terminal device.

6. The system according to claim 1, wherein
the information of the terminal device managed by the management device comprises at least one of mobility information of the terminal device, information on an application used by the managed terminal device, and attribute information of the managed terminal device.

7. The system according to claim 6, wherein
the mobility information comprises at least one of position information, speed, and a moving direction of the managed terminal device.

8. The system according to claim 1, wherein
the managed terminal device is managed by the one or more management devices including a position of the terminal device itself in the management areas.

9. The system according to claim 8, wherein
the management device currently managing the managed terminal device sets, as the managed terminal device, one of the one or more terminal devices that is not a management target of another one of the management devices in the lower layer among the terminal devices positioned in the management area of the management device currently managing the managed terminal device.

10. The system according to claim 1, wherein
one of the management devices that is in the upper layer comprises at least one of a mobility management entity (MME) and a home subscriber server (HSS).

11. The system according to claim 1, wherein
in implementation of a tracking area (TA) update, the management device currently managing the managed terminal device updates the information of the managed terminal device.

12. The system according to claim 1, further comprising
a coordinated control device configured to control processing for allowing the plurality of management devices to coordinately manage the information of the plurality of terminal devices.

13. The system according to claim 12, wherein
the coordinated control device selects the terminal device serving as a management target of each of the management devices on the basis of the information of the terminal devices.

14. The system according to claim 12, wherein
the coordinated control device stores information indicating the layered structure and the terminal device serving as the management target of each of the management devices.

15. The system according to claim 14, wherein
the coordinated control device updates the stored information in accordance with movement of the terminal device serving as the management target of each of the management devices.

16. The system according to claim 14, wherein
the coordinated control device updates the stored information in accordance with a change of the layered structure.

17. A method comprising
in a case where a management device included in a system comprising a plurality of management devices configured to manage information of one or more terminal devices positioned in management areas and having a layered structure in which the management area of the management device in an upper layer comprises the management areas of more than one of the management devices in a lower layer recognizes a possibility of movement of the terminal device serving as a management target to outside of the management area, notifying another one of the management devices in a same layer or an upper layer of information indicating the possibility of the movement of the terminal device, and upon determination of a possibility of movement of a managed terminal device of the one or more terminal devices serving as a management target from a first one of the management areas of the lower layer to another of the management layers in the lower layer, changing management of the managed terminal device from the lower layer to the upper layer, wherein the determination of the possibility of movement is made when an elapsed time from transmission of a paging message in the first one of the management areas of the lower layer exceeds a threshold without receiving a response from the terminal device.

18. A terminal device managed by a system comprising a plurality of management devices configured to manage information of one or more terminal devices positioned in management areas and having a layered structure in which the management area of the management device in an upper layer comprises the management areas of more than one of the management devices in a lower layer, the terminal device being configured such that upon determination of a possibility of movement of the terminal device from a first one of the management areas of the lower layer to another of the management layers in the lower layer, management of the terminal device is changed from the lower layer to the upper layer, wherein the determination of the possibility of movement is made when an elapsed time from transmission of a paging message in the first one of the management areas of the lower layer exceeds a threshold without receiving a response from the terminal device.

* * * * *